United States Patent [19]
Rosen et al.

[11] Patent Number: 5,998,899
[45] Date of Patent: Dec. 7, 1999

[54] MAGNETIC BEARING SYSTEM INCLUDING A CONTROL SYSTEM FOR A FLYWHEEL AND METHOD FOR OPERATING SAME

[75] Inventors: Harold A. Rosen, Santa Monica; Claude Khalizadeh, Newbury Park; Scott B. Pano, Torrance; Joseph J. Kubicky, Woodland Hills; Seymour N. Rubin, Los Angeles, all of Calif.

[73] Assignee: Rosen Motors L.P., Woodland Hills, Calif.

[21] Appl. No.: 08/952,451

[22] PCT Filed: Jun. 12, 1997

[86] PCT No.: PCT/US97/08661

§ 371 Date: Nov. 20, 1997

§ 102(e) Date: Nov. 20, 1997

[87] PCT Pub. No.: WO97/48169

PCT Pub. Date: Dec. 18, 1997

Related U.S. Application Data

[63] Continuation of application No. 08/752,593, Nov. 19, 1996, Pat. No. 5,708,312, which is a continuation of application No. 08/663,791, Jun. 14, 1996, Pat. No. 5,864,303.

[51] Int. Cl.$^6$ ....................................................... H02K 7/09
[52] U.S. Cl. ............................. 310/90.5; 310/74; 310/90; 310/112; 310/113; 310/165; 74/572; 74/574
[58] Field of Search ............................... 310/74, 90, 90.5, 310/112, 113, 165; 74/572, 574

[56] References Cited

U.S. PATENT DOCUMENTS

| | | | |
|---|---|---|---|
| 4,626,754 | 12/1986 | Habermann et al. | 318/960 |
| 4,694,235 | 9/1987 | Flowers | 318/662 |
| 4,700,094 | 10/1987 | Downer et al. | 310/90.5 |
| 4,999,534 | 3/1991 | Andrianos | 310/90.5 |
| 5,202,824 | 4/1993 | Chen | 364/508 |
| 5,314,868 | 5/1994 | Takahata et al. | 505/166 |
| 5,345,125 | 9/1994 | Pinkerton et al. | 310/90.5 |
| 5,355,041 | 10/1994 | Shirao et al. | 310/90.5 |
| 5,462,402 | 10/1995 | Bakholdin et al. | 415/90 |
| 5,491,396 | 2/1996 | Takahashi et al. | 318/632 |
| 5,559,381 | 9/1996 | Bosley et al. | 310/34 |
| 5,566,588 | 10/1996 | Bakholdin et al. | 74/572 |
| 5,568,023 | 10/1996 | Grayer et al. | 518/139 |
| 5,576,587 | 11/1996 | Takahashi et al. | 310/90.5 |
| 5,614,777 | 3/1997 | Bitterly et al. | 310/74 |
| 5,628,232 | 5/1997 | Bakholdin et al. | 74/572 |
| 5,708,312 | 1/1998 | Rosen | 310/90 |
| 5,767,595 | 6/1998 | Rosen | 310/74 |
| 5,770,909 | 6/1998 | Rosen et al. | 310/113 |
| 5,864,303 | 1/1999 | Rosen | 340/870 X |

*Primary Examiner*—Elvin G. Enad
*Attorney, Agent, or Firm*—Westerlund & Powell, P.C.; Raymond H.J. Powell, Jr.; Robert A. Westerlund

[57] ABSTRACT

A bearing system for positioning and supporting a rotor having a vertical shaft (20) coincident with a main rotation axis included in a flywheel (10) used for energy storage and high surge power in vehicular applications. The bearing system includes upper and lower radial force generators (110, 210) containing only electromagnets, and upper and lower axial force generators (120, 220) including an electromagnet and a permanent magnet. According to one aspect of the bearing system, each of the bearings includes control circuitry having simple and complex lead networks so as to permit the force generators to rapidly respond to vehicular transients while maintaining a preferred bearing stiffness. The bearing system also includes upper and lower touchdown ball bearings (130, 230) which are engaged only when the radial force generators are unable to maintain the rotor in a predetermined cylindrical volume within the flywheel (10). A capacitive sensor subsystem of the magnetic bearing system and method for controlling the bearing system is also described.

2 Claims, 40 Drawing Sheets

R1

R2

R3

R4

R5

R6

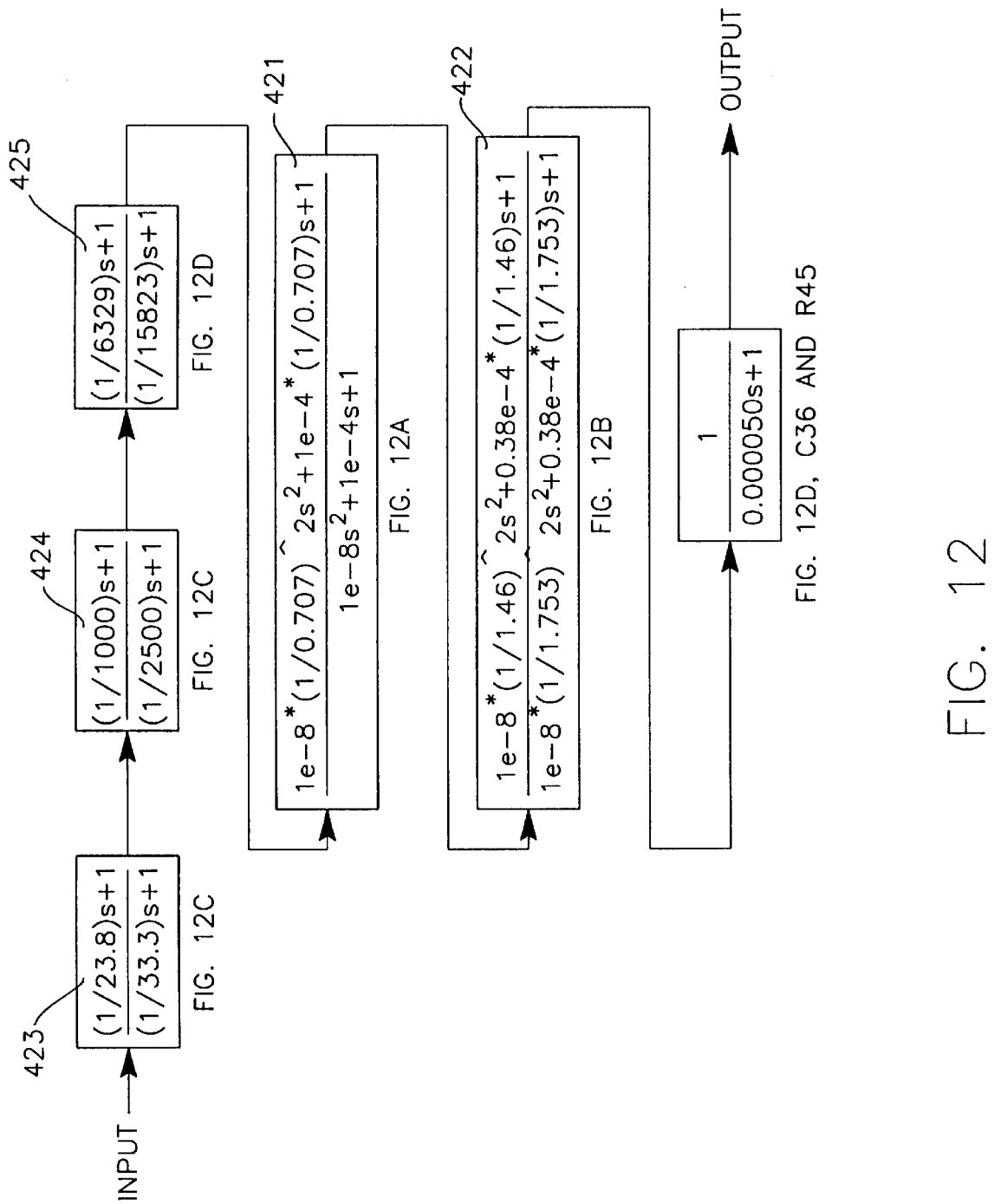

A1

A2

MAGNETIC BEARING SYSTEM INCLUDING A CONTROL SYSTEM FOR A FLYWHEEL AND METHOD FOR OPERATING SAME

This is a 371 of PCT/US97/08661, filed on Jun. 12, 1997 which is a continuation of U.S. application Ser. No. 08/752, 593 filed on Nov. 19, 1996 now U.S. Pat. No. 5,708,312 which is a continuation of U.S. application Ser. No. 08/663, 791 filed Jun. 14, 1996 now U.S. Pat. No. 5,864,303.

BACKGROUND OF THE INVENTION

1. Field of the Invention

The present invention relates to a magnetic bearing system employed in a high power (on the order of 100–200 kilowatts) flywheel intended for a hybrid electric vehicle and other applications. More specifically, the present invention relates to a magnetic bearing system employed in a high power flywheel to overcome the stringent demands regarding high electrical power and vehicle motions placed on the stiffness and speed of response of the magnetic bearings while the vehicle is being driven. Moreover, the present invention relates to a magnetic bearing system employed in a high power flywheel producing the long rundown time required, thus providing the extremely low power consumption required, for a parked vehicle. In addition, the present invention relates to a capacitive sensor for the magnetic bearing, which capacitive sensor measures the displacement of a rotor axis from its desired position within a non-rotating assembly of the magnetic bearing.

2. Brief Discussion of Related Art

Modem high strength-to-weight ratio fibers make it possible to construct high energy density flywheels, which, when combined with high power (on the order of 100–200 kilowatts) motor-generators, are an attractive alternative to electrochemical batteries for use as energy buffers in hybrid electric vehicles. A properly designed flywheel system would provide higher power density, higher efficiency, and longer life than a conventional electrochemical battery.

Flywheel energy storage systems have been proposed for many years; many of the storage systems have even been proposed for use in motor vehicles. U.S. Pat. No. 3,741,034, for example, discloses a flywheel contained in an evacuated sphere which is surrounded by a liquid but does not address itself to the dynamics of the driving environment. U.S. Pat. Nos. 4,266,442, 4,285,251 and 4,860,611, on the other hand, disclose different ways of constructing high speed rotors. However, the above referenced patents do not recognize, let alone describe, design features needed for compatibility with the environment of a motor vehicle.

High speed rotors (greater than 2500 radians per second, for example) such as used in high energy density flywheels, often require a magnetic bearing system in order to avoid the problems associated with the lubrication and cooling of mechanical bearings. Magnetic bearings require a set of sensors to measure, with adequate speed and precision, the displacement of the rotor axis from its neutral position in order for the corrective magnetic forces to be applied in a timely fashion.

U.S. Pat. Nos. 3,490,816 and 3,860,300, both of which were issued to Joseph Lyman, describe the general principles of a magnetic bearing system wherein the static load, i.e., the resting weight of a rotor, is supported by one or more permanent magnets while dynamic force generators, i. e., force coils, provide compensation for acceleration differences between the rotor and a surrounding stator. In U.S. Pat. No. 3,490,816, for example, the axial velocity is derived from a sensing coil disposed above the load bearing permanent magnet while axial displacement over relatively long time periods is sensed using an opaque piston, a light source, optical baffles and optical sensors arranged at the end of the rotor shaft opposite the permanent magnet. The system proposed in U.S. Pat. No. 3,490,816 requires two separate amplifiers, one specifically matched to the associated sensor type.

It will be appreciated that non-contacting sensors are required for high speed energy storage flywheel systems because non-contacting sensors offer long life in a high rotational speed environment. Examples of non-contacting sensors are disclosed in U.S. Pat. Nos. 5,036,236 and 5,314,868. While magnetic sensors such as those disclosed in either U.S. Pat. No. 3,490,816 or U.S. Pat. No. 5,036,236 may be used, magnetic sensors are generally degraded by changes in the material properties of the surfaces being sensed, such as the electrical resistivity and magnetic permeability of the sensed surfaces.

On the other hand, optical sensors such as those disclosed in U.S. Pat. No. 3,490,816 may be subject to degradation since such optical sensors normally include delicate, sophisticated circuit components. These supporting components would frequently be located outside of the flywheel enclosure, which would require the routing of signal lines between the optical sensors themselves and the supporting components and between the supporting components and the force generators. It will be appreciated that this would severely complicate the connections between the energy storage flywheel and the rest of the power train components. An alternative approach would be to locate the supporting components within the confines of the flywheel, which would simplify the cable routing concerns but would require additional efforts to adapt the supporting components to the environment of the interior of the flywheel, i.e., a vacuum environment.

The magnetic bearing system described in U.S. Pat. No, 3,860,300 proposes a virtually zero powered magnetic suspension system, which may provide a solution to the problem of maximizing the rundown time in the parking mode of operation. However, the system proposed in U.S. Pat. No. 3,860,300 is not up to the task of compensating for high velocity rotor displacements while maintaining adequate bearing stiffness in the driving mode of operation.

U.S. Pat. No. 4,511,190 to Caye et al. describes a magnetic bearing system for stationary systems that uses a passive method of controlling radial instability, which system is apparently incompatible with the automobile environment. U.S. Pat. No. 5,216,308 to Meeks describes an efficient combination of permanent magnets and electromagnets in radial magnetic bearings. It will be appreciated that the use of permanent magnets in the radial bearings is incompatible with the need for a long run down time in the parking mode, since the eddy currents developed in the rotor create losses which must be replaced with energy stored in the flywheel.

The present invention was motivated by a desire to correct the perceived weaknesses and identified problems associated with conventional magnetic bearing systems used with flywheel energy storage systems.

SUMMARY OF THE INVENTION

The principal purpose of the present invention is to allow the rotor of a flywheel to freely rotate at high speeds, up to 6500 radians per second, without contacting the rotationally stationary elements surrounding the rotor, with which the rotor has small clearances, in a driving environment which may produce high accelerations in all directions. According to one aspect of the present invention, the magnetic bearing system consumes extremely low amounts of power when the vehicle is parked, so that a long rundown time for the flywheel may be attained.

An object according to the present invention is to produce a magnetic bearing system for supporting the rotor of a flywheel used for energy storage and high surge power in vehicular applications. According to one aspect of the present invention, the bearing system includes upper and lower radial force generators using only electromagnets, and upper and lower axial force generators each including an electromagnet with the upper axial force generator having a permanent magnet. According to another aspect of the present invention, the magnetic bearing system is backed up by upper and lower touchdown ball bearings, which advantageously are engaged only under extraordinary mechanical load conditions.

Another object according to the present invention is to produce a magnetic bearing system which is capable of suspending the rotor under all foreseeable high accelerations the vehicle may encounter during braking, turning, or accelerating, or the vibrations caused by traversing rough roads at high speeds, without engaging the touchdown bearings.

A further object according to the present invention is to produce a magnetic bearing system capable of suspending the rotor without engaging the touchdown bearings, despite the highest radial forces which can be exerted by a high power motor-generator.

A still further object according to the present invention is to produce a magnetic bearing system wherein the suspension requirements described immediately above are met despite the small radial gaps of the touchdown bearings which are necessitated by the small radial gaps between rotating and stationary elements of the flywheel.

Yet another object according to the present invention is to produce a magnetic bearing system wherein the power consumption of the electronic control elements is sufficiently low while driving to produce a negligible impact on the fuel economy of the vehicle.

A still further object according to the present invention is to produce a magnetic bearing system wherein the power consumption of the electronic control elements while the vehicle is parked is small enough to be supplied for several weeks by the electrical energy stored in the vehicle's starter battery.

Another object according to the present invention is to produce a magnetic bearing system whereby the rotor losses caused by eddy currents is small enough when the vehicle is parked to produce a rotor spin down time on the order of several weeks.

Yet another object according to the present invention is to produce a magnetic bearing system wherein the magnetic bearings and the associated control circuitry are sufficiently compact to be contained entirely within the vacuum envelope of the flywheel, and efficient enough to be easily cooled by a flywheel stator cooling system.

Another object according to the present invention is to produce a magnetic bearing system producing the high equivalent spring stiffness required to overcome starting, acceleration and vibration requirements in a dynamically stable system.

Still another object according to the present invention is to produce a magnetic bearing system producing a high equivalent spring stiffness required to overcome starting, acceleration and vibration requirements in a dynamically stable system whose resonance damping phase lead is achieved with minimum high frequency gain.

According to one aspect of the present invention, the use of narrow band phase lead networks, having complex poles and zeroes, permits damping of the higher frequency resonances of the rotor with minimum gain. According to another aspect of the present invention, the use of a very low frequency phase lead network permits damping of the low frequency resonance associated with rigid body coning motion at high spin speeds. This latter aspect is advantageously achieved by the processing of this function in a separate path to the processor.

Yet another object according to the present invention is to produce a magnetic bearing system producing the high equivalent spring stiffness required without overloading the power amplifiers by eliminating the synchronous runout signal in the operating speed range of the rotor.

Another object according to the present invention is to produce a magnetic bearing system which is non-responsive to a selected shaft bending mode frequency. According to one aspect of the present invention the selected shaft bending mode is a sinusoidal bending mode. Preferably, the control electronics incorporated into the magnetic bearing system includes narrow band notch filters tuned to the sinusoidal shaft bending mode frequency.

Still another object according to the present invention is to produce control circuitry for a magnetic bearing system which squelches incipient system oscillations associated with control system power amplifier non-linearities. According to one aspect of the present invention, the control circuitry includes a rapidly acting gain reduction circuit.

Yet another object according to the present invention is to produce control circuitry for a magnetic bearing system which greatly simplifies the tasks performed by an included processor, making the circuitry realizable in an affordable unit, while reducing the power consumption as compared to single path control circuitry implementation.

An object according to the present invention is to produce electrical sensing element for a radial magnetic bearing which is disposed within the void space of the radial magnetic bearing. According to one aspect of the present invention, the electrical sensing element is a capacitive sensor. According to another aspect of the present invention, exact alignment between the capacitive sensor and a bearing force generator, e.g., the radial magnetic bearing, is readily achieved.

Another object according to the present invention is to produce an electrical sensing element for an axial magnetic bearing having a substantially identical footprint to that of the coil disposed with the axial magnetic bearing.

A further object according to the present invention is to provide a capacitive sensor system including at least one capacitive sensor for determining position of a proximate portion of the rotor shaft and a circuit for generating a signal indicative of the position of the rotor shaft. According to one aspect of the invention, the capacitive sensor system is inherently linear. According to another aspect of the present invention, N capacitive sensors can be used with N/2 of the circuits to sense the position of the rotor shaft within a radial magnetic bearing and to generate signals indicative of that position. According to yet another aspect of the present invention, the use of a single master oscillator for all of the capacitive sensors avoids the production of beat frequencies which could introduce false position signals into the capacitive sensor system. According to one other aspect of the present invention, the error signals developed by the capacitive sensors are used to generate the correcting forces in the magnetic force generators which restore the rotor axis to its desired position.

A still further object according to the present invention is to provide a capacitive sensor system including a capacitive sensor for determining position of a proximate portion of the rotor shaft and a circuit for generating a robust position signal indicative of the rotor shaft position. According to one aspect of the invention, the capacitive sensor system includes an inductor for inductively tuning out stray capacitance in the capacitive sensor system. According to another aspect of the present invention, the circuit is powered by a voltage produced by a high frequency oscillator applied to a fixed capacitor via the inductor; the resultant inductive tuning and high frequency voltage signal advantageously cooperate to produce a position signal having a high signal to noise ratio.

Yet another object according to the present invention is to provide a capacitive sensor system capable of the fast response times, in the microsecond range, essential for high speed magnetic bearing control.

According to an exemplary embodiment of the present invention, the magnetic bearing system consists of displacement sensors which detect the displacement of the rotor from its desired position, signal processing amplifiers which impose desired dynamic functions on the signals generated by the displacement sensors, and amplifiers powering magnetic force generators which restore the rotor to its desired position in accordance with the amplified signals. Advantageously, there may be radial bearings near each end of the rotor shaft, each of which controls forces in two directions orthogonal to the rotational axis of the rotor. In addition, axial bearings are preferably located near each end of the rotor shaft, which axial bearings control forces along the rotational axis. According to the exemplary case, the magnetic bearing system advantageously can include six sensors, six signal processing amplifiers, and ten force generators.

These and other objects, features and advantages according to the present invention are provided by control circuitry for a magnetic bearing system wherein the digital processing is separated into high and low rate paths having high and low rate signals, respectively, the high rate path being used for high frequency phase compensation, the low rate path being used for low frequency phase compensation.

These and other objects, features and advantages according to the present invention are provided by a bearing system positioning and supporting a rotor having a vertical shaft coincident with a main rotation axis included in a flywheel used for energy storage and high surge power in vehicular applications. Preferably, the bearing system includes first and second radial force generators, which include only electromagnets and which are located in a plane perpendicular to the rotation axis, third and fourth radial force generators, which include only electromagnets and which are located in a different plane perpendicular to the rotation axis, and upper and lower axial force generators each containing an electromagnet and a permanent magnet. According to one aspect of the present invention, the bearing system additionally includes upper and lower touchdown ball bearings which are engaged only when the first through fourth radial force generators are unable to maintain the rotor in a predetermined cylindrical volume within the touchdown bearing inner race.

These and other objects, features and advantages according to the present invention are provided by a bearing system of a flywheel for positioning and supporting a rotating assembly including a vertical shaft coincident with a main rotation axis and an attached cylinder used for energy storage and high surge power delivery. Preferably, the bearing system includes first through fourth radial force generators disposed in a first plane perpendicular to the rotation axis of the rotating assembly, the first through fourth force generators including only electromagnets, fifth through eighth radial force generators disposed in a second plane perpendicular to the rotation axis of the rotating assembly and different than the first plane, the fifth through eighth force generators including only electromagnets, an upper axial force generator containing an electromagnet and a permanent magnet, and first and second circuits for maintaining the rotor in a predetermined cylindrical volume within the flywheel when forces generated by the first through eighth radial force generators are less than displacement force applied to the shaft. According to one aspect of the invention, a lower axial force generator can be included in the magnetic bearing system in the event that the flywheel is subjected to rapid vertical displacements, e.g., vertical shocks applied to a vehicle in motion.

These and other objects, features and advantages according to the present invention are provided by a radial magnetic bearing system for supporting a rotating assembly including a rotor having N modes of vibration and a circuit generating a shaft signal indicative of shaft speed in a flywheel. Preferably, the radial magnetic bearing includes a radial magnetic bearing including a plurality of radial force generators disposed in a plane perpendicular to the rotation axis of the rotor, the force generators including only electromagnets, and a control system positively damping N-1 modes of vibration using N-I phase lead networks and 1 synchronous notch filter responsive to the shaft signal for eliminating a synchronous runout signal generated by the control system in a predetermined operating speed range. Advantageously, N can be an integer greater than 2.

These and other objects, features and advantages according to the present invention are provided by a control system for operating a bearing system of a flywheel having first through fourth radial force generators disposed in a first plane perpendicular to the rotation axis of a rotating assembly, the first through fourth force generators including only electromagnets, fifth through eighth radial force generators disposed in a second plane perpendicular to the rotation axis of the rotating assembly and different than the first plane, the fifth through eighth force generators including only electromagnets, an upper axial force generator containing an electro-magnetic and a permanent magnet, and a lower axial force generator containing an electromagnetic for positioning and supporting the rotating assembly including a vertical shaft coincident with a main rotation axis and an attached massive cylinder used for energy storage and high surge power delivery. Preferably, the control system includes first through fourth sensors for locating the rotor with respect to the first through eighth radial force generators and for generating corresponding first through fourth position signals, notch filters, eliminating the synchronous runout signal generated by the control system in an operating speed range, for receiving the first through fourth position signals and a rotor speed signal and for generating first through fourth filtered signals, transfer function circuits which dynamically stabilize the control system for receiving the filtered signal and for applying a transfer function so as to generate first through fourth transfer function signals;

gain control circuits responsive to the first through fourth transfer function signals and respective first through eighth coil currents for generating respective first through fourth gain-limited signals, first through eighth square root circuits each receiving one of the first through fourth gain-limited signals for generating respective first through eighth square root signals, and first through eighth power amplifiers for generating respective first through eighth coil currents responsive to respective first through eighth square root signals. According to one aspect of the present invention, the first through eighth coil currents excite respective ones of the first through eighth radial force generators.

These and other objects, features and advantages according to the present invention are provided by a method system for operating a bearing system of a flywheel having first through fourth radial force generators disposed in a first plane perpendicular to the rotation axis of a rotating assembly, the first through fourth force generators including only electromagnets, fifth through eighth radial force generators disposed in a second plane perpendicular to the rotation axis of the rotating assembly and different than the first plane, the fifth through eighth force generators including only electromagnets, an upper axial force generator containing an electromagnetic and a permanent magnet, and a lower axial force generator containing an electromagnetic for positioning and supporting the rotating assembly including a vertical shaft coincident with a main rotation axis and an attached massive cylinder used for energy storage and high surge power delivery. Advantageously, the method includes steps for locating the rotor with respect to the first through eighth radial force generators and for generating corresponding first through fourth position signals, eliminating the synchronous runout signal generated by the control system in an operating speed range, by receiving the first through fourth position signals and a rotor speed signal and thereby generating first through fourth filtered signals, dynamically stabilizing the control system by receiving the filtered signal and applying a transfer function so as to generate first through fourth transfer function signals, generating respective first through fourth gain-limited signals responsive to the first through fourth transfer function signals and respective first through eighth coil currents, generating respective first through eighth square root signals responsive to the first through fourth gain-limited signals, and generating the first through eighth coil currents responsive to respective first through eighth square root signals, each of the first through eighth coil currents exciting a respective one of the first through eighth radial force generators.

These and other objects, features and advantages according to the present invention are provided by a capacitive position sensor, located within the confines of a magnetic bearing supporting a rotating shaft, including a capacitive member disposed proximate to the rotating shaft, the capacitive member being electrically coupled to the rotating shaft so as to permit sensing of capacitance of the capacitive member with respect to the rotating shaft.

These and other objects, features and advantages according to the present invention are provided by a capacitive position sensor located within a bearing stator of a radial magnetic bearing positioning a rotating shaft, the radial magnetic bearing including an outer ring, N teeth disposed within the outer ring, wherein all of the projecting ends of the teeth define a cylindrical surface of predetermined radius, and N coils, each of the coils surrounding a respective one of the teeth and each of the N coils being located adjacent to the outer ring so as to expose an end portion of the respective N teeth proximate to the associated projecting ends. The capacitive position sensor includes a capacitive member disposed within a void space defined by respective projecting ends of adjacent ones of the N teeth and the cylindrical surface and proximate to the rotating shaft, the capacitive member being electrically coupled to the rotating shaft so as to permit sensing of capacitance of the capacitive member with respect to the rotating shaft.

These and other objects, features and advantages according to the present invention are provided by a capacitive position sensor located within the confines of a bearing stator of an axial magnetic bearing axially positioning a rotating shaft including a first end surface proximate to a first end of the rotating shaft and perpendicular to the rotation axis of the rotating shaft, the axial magnetic bearing including a cylindrical coil having a coil axis located coaxial with the rotation axis of the rotating shaft, wherein the axial magnetic bearing includes a second end surface perpendicular to the coil axis, wherein the first and second end surfaces are disposed adjacent to one another and wherein the first and second end surfaces are substantially parallel. The capacitive position sensor includes a capacitive member disposed within the confines of the axial magnetic bearing and between the cylindrical coil and the first end surface of the rotation shaft, the capacitive member being electrically coupled to the rotating shaft so as to permit sensing of capacitance of the capacitive member with respect to the rotating shaft.

These and other objects, features and advantages according to the present invention are provided by a capacitive sensor system detecting position of a rotating shaft in a flywheel energy storage system positioned by a magnetic bearing and generating a control signal indicative of the position of the rotating shaft. Preferably, the capacitive sensor system includes a capacitive member disposed proximate to the rotating shaft, the capacitive member being electrically couple to the rotating shaft so as to permit sensing of capacitance of the capacitive member with respect to the rotating shaft and a sensing circuit, electrically coupled to the capacitive member, receiving a high frequency voltage signal and generating the control signal responsive to the capacitance between the capacitive member and the rotating shaft.

These and other objects, features and advantages of the invention are disclosed in or will be apparent from the following description of preferred embodiments, when taken in conjunction with the following drawings.

BRIEF DESCRIPTION OF THE DRAWINGS

The preferred embodiment is described with reference to the drawings, in which like elements are denoted by like numbers and in which:

FIG. 6C is a graph which is useful in explaining the capacitive sensor response;

FIG. 8A shows the radial modal frequencies associated with the rotating assembly illustrated in FIG. 2A as a function of the rotor rotation speed while

FIG. 12 is a mathematical function diagram collectively formed from FIGS. 12A through 12D, which

FIG. 30A is a high level block diagram illustrating the axial transfer function employed in the circuitry of FIG. 27 while

DETAILED DESCRIPTION OF THE PREFERRED EMBODIMENTS

Figure 33:
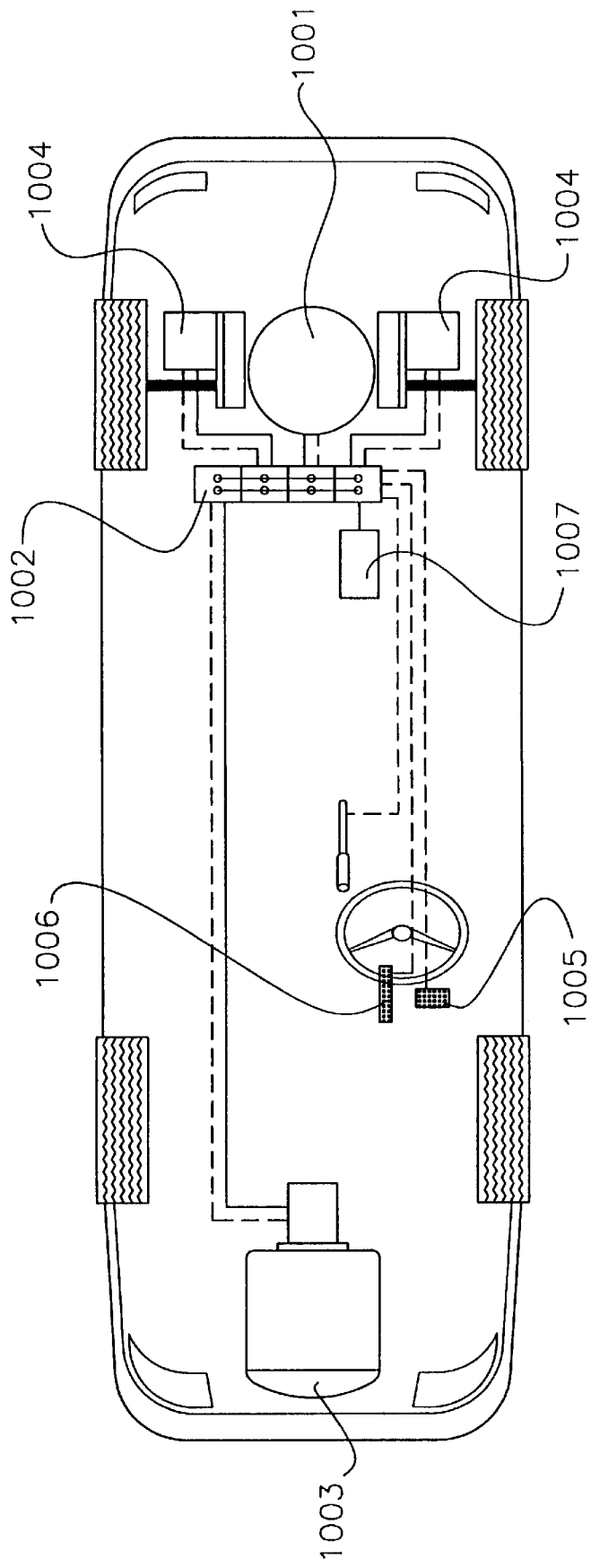
FIG. 33 is a partially cutaway sketch of a hybrid electric vehicle showing the elements of its power train including a high level diagram of its power control system.

FIG. 33 shows the power train elements of a hybrid electric vehicle using a flywheel 1001 as an energy buffer. In this configuration, the flywheel 1001 provides surge power for accelerating the vehicle and for hill climbing, complementing the relatively low, steady power provided by a fuel-burning power source 1003, e.g., a turbo-generator set. The flywheel 1001 is also used to absorb energy by storing it during dynamic braking and downhill driving. An electric motor (or drive motors) 1004 converts the electric power from either the flywheel 1001 or power source 1003 to mechanical motive power. Preferably, all of these elements are regulated by the electronic controller 1002, which regulates the vehicle's power flow in response to the driver's inputs, which inputs are supplied by the accelerator pedal 1005 and the brake pedal 1006. Controller 1002 channels power to the drive motor (or motors) 1004 from the turbo-generator 1003 during cruise conditions and augments this power with power from flywheel 1001 for accelerating or hill climbing. Controller 1002 advantageously charges the flywheel 1001 with power from the drive motor 1004 (or motors) which acts (act) as a generator during braking or downhill driving. Preferably, controller 1002 maintains the speed of flywheel 1001 within a predetermined range by charging it from power source 1003 to avoid its lower limit or giving flywheel 1001 a higher share of the driving load to thus avoid the flywheel's 1001 upper limit. Controller 1002 also channels power from the flywheel 1001, or a storage battery 1007 to the power source 1003 for starting. In FIG. 33, power leads are designated by solid lines and signal leads are designated by dashed lines. It will be appreciated that storage battery 1007 advantageously can be used to supply power to the vehicle for energizing control systems and components associated with flywheel 1001.

Figure 1:
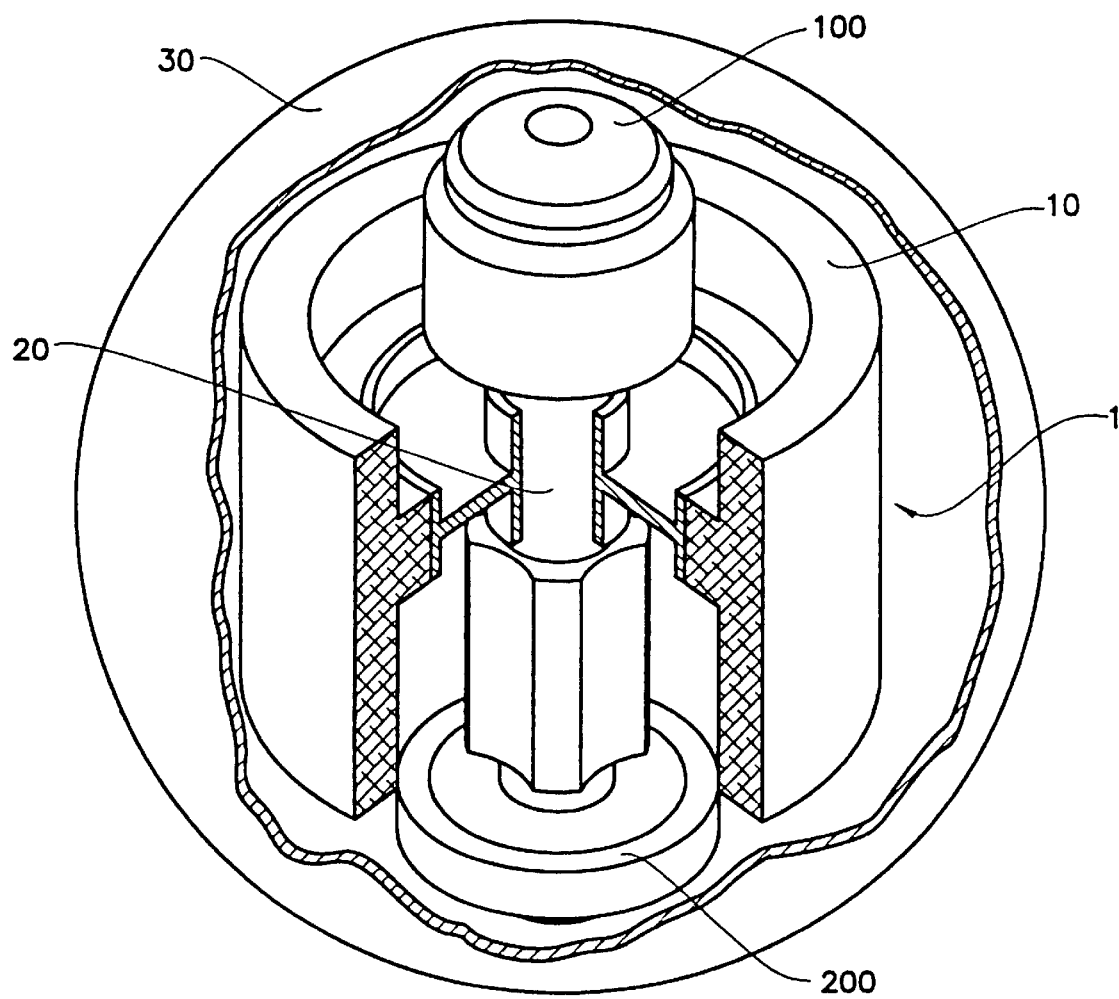
FIG. 1 is an interior view of selected components of a flywheel energy storage system.
Figure 2A:
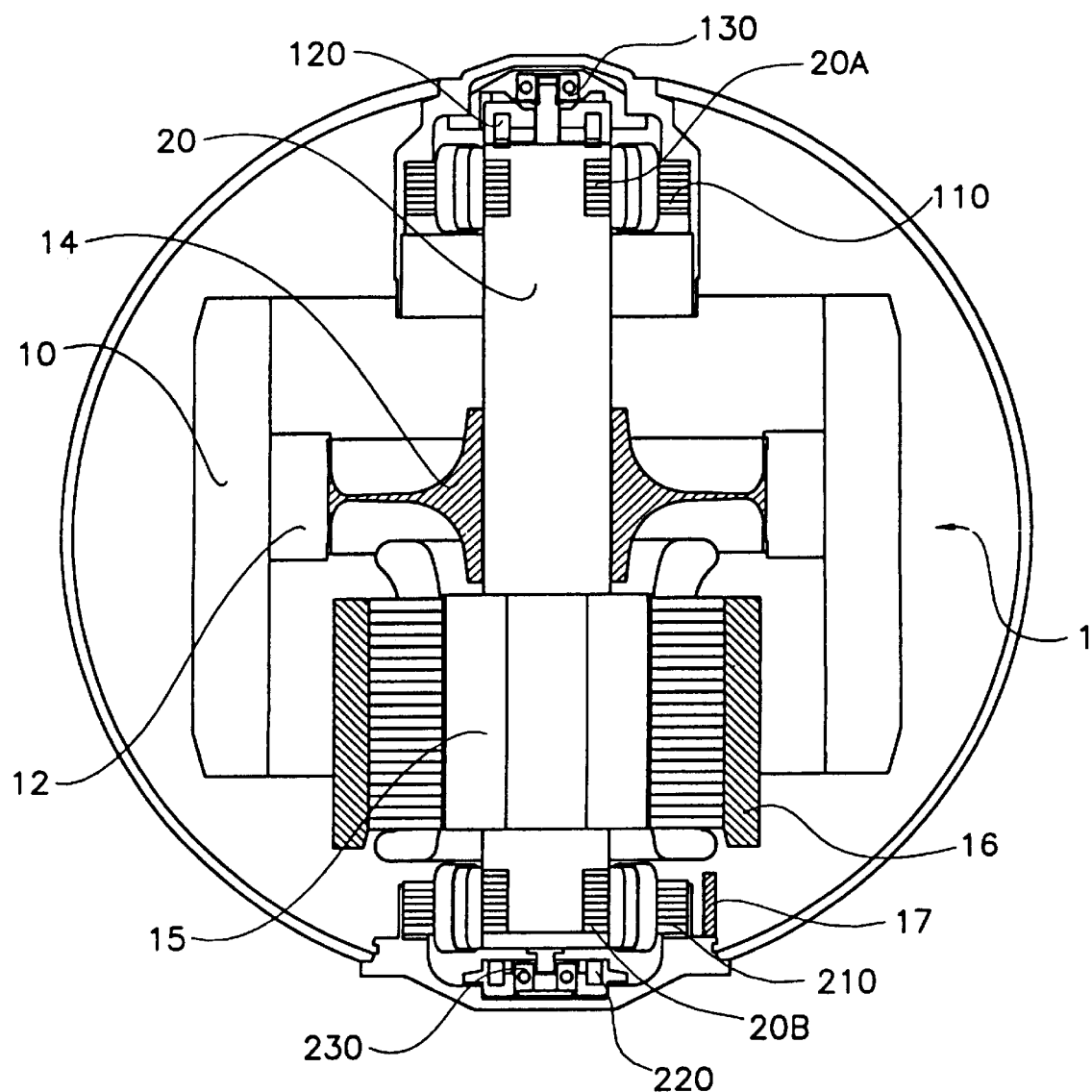
FIG. 2A is a sectional view of these selected components of the flywheel energy storage system in isolation and FIG. 2B illustrates the integration of the components of FIG. 2A into the overall magnetic bearing system included in the flywheel.

The general arrangement of the flywheel energy storage system according to the present invention is shown in the interior view of FIG. 1, wherein a rotating assembly 1, i.e., the flywheel 1001, includes an energy storing cylinder 10 connected to the rotating shaft 20, which shaft is supported by upper and lower bearing elements 100 and 200. These components are enclosed within a vacuum housing 30, which housing can be suspended within an outer housing by a gimbal system (not shown), or the like. The bearing elements 100, 200 include respective radial magnetic bearings 110 and 210 and axial bearings 120 and 220, as illustrated in FIG. 2A. Each of the bearing elements advantageously includes a mechanical touchdown bearing 130, 230. Preferably, the rotating assembly 1 is powered by motor 15, including a rotor 15a and a stator 15b. The stator 15b advantageously can be supported by a cooling mechanism 16 surrounding the stator 15b. Beneficially, one or more circuit assemblies 17 can be provided to support the control circuitry making up the electronic control system, which control system is discussed in greater detail below.

Figure 2B:
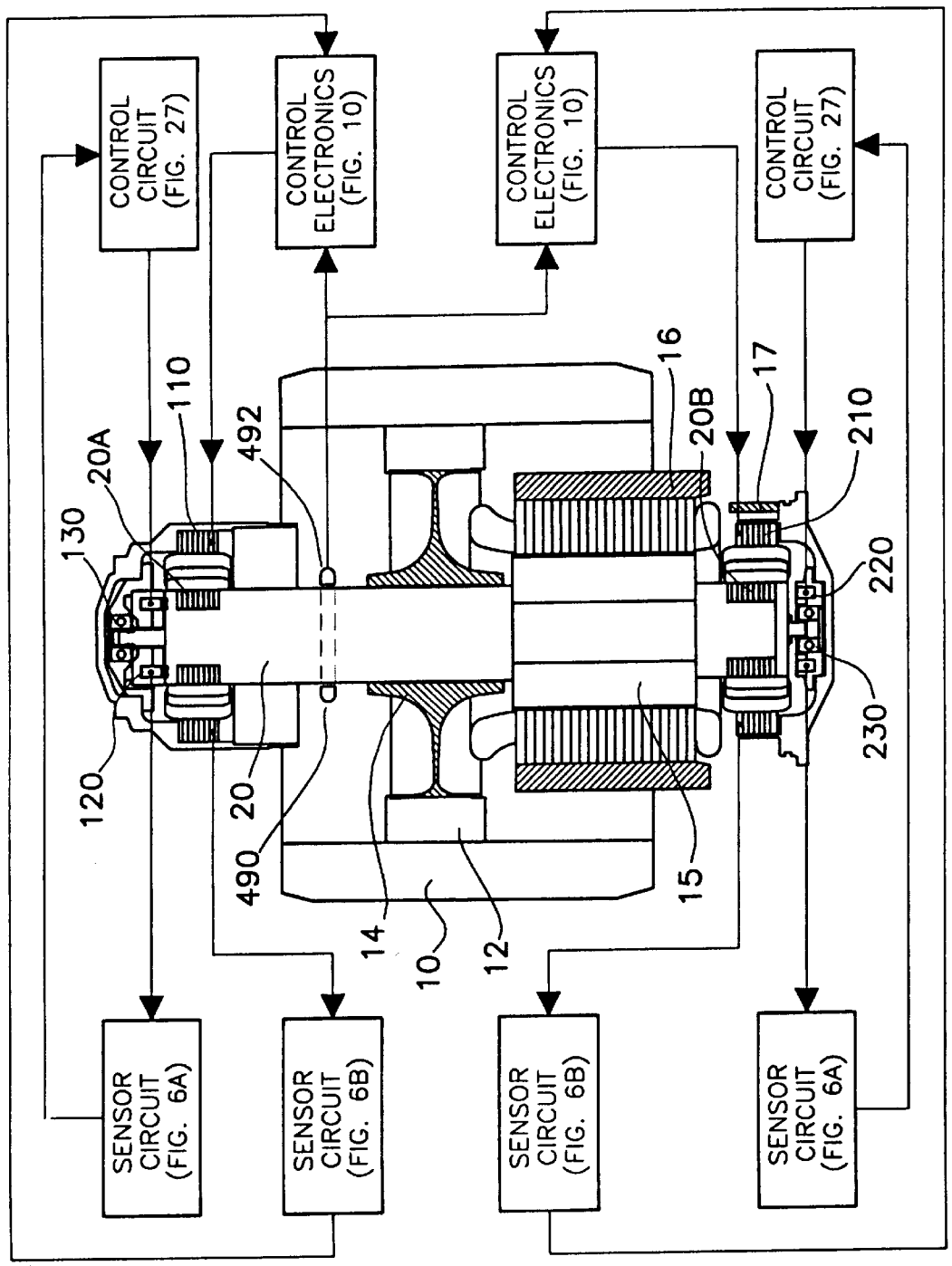

The cylinder 10 in this exemplary case is 12 inches in diameter and stores 4 million joules of energy at a maximum rotational speed of 6500 radians per second. It will be appreciated that this corresponds to a surface speed of 990 meters per second. It will be noted that this high speed requires that the rotating assembly 1, i.e., the cylinder 10 mechanically connected to rotating shaft 20, be enclosed in an evacuated container, i.e., vacuum housing 30. The combined design requirements of a high rotational speed, a vacuum environment, and a desired long life with low friction makes the use of magnetic bearings preferable to mechanical bearings for this application. The preferred embodiment, according to the present invention illustrated in FIGS. 1, 2A and 2B, uses active radial bearings 110, 210 in an upper and lower position along the shaft 20, each having two orthogonal force directions transverse to the axis of shaft 20, and active axial bearings 120 and 220 in upper and lower positions along the shaft 20 which have a force direction along the axis of shaft 20.

It should be noted that active magnetic bearings require a system of sensors to measure the deviation of the shaft axis from its desired position within the respective bearing stator. In a preferred embodiment according to the present invention, each radial bearing 110, 210 has a sensor, e.g., sensor element 112 with its nonconducting mechanical supporting structure 114 (illustrated in FIG. 4), for each of its force directions, and each axial bearing has a single sensor, for example, sensor 122 (illustrated in FIG. 22).

Non-contacting sensors are required for this application because of the requirement for long life in conjunction with the high rotational speeds. Such sensors may use either magnetic or electric fields for their operation. As discussed above, magnetic sensors are generally degraded by changes in the material properties of the surfaces being sensed, such as their resistivity and permeability and, thus, are not suited for flywheel energy storage system applications. Electric field sensors, which detect the change in capacitance between the sensor element and the rotor shaft, advantageously are not affected by changes in these properties.

The capacitance sensor elements are designed for the bearing elements 100, 200 shown in FIG. 1 and preferably are mechanically integrated into the force generators 1 19, providing improvements both in accuracy and ease of assembly compared to systems whose position sensors are physically separate from the force generators. It will be appreciated that the sensors for the radial and the axial bearing elements 110, 210 and 120, 220, respectively, are of different designs.

Figure 3:
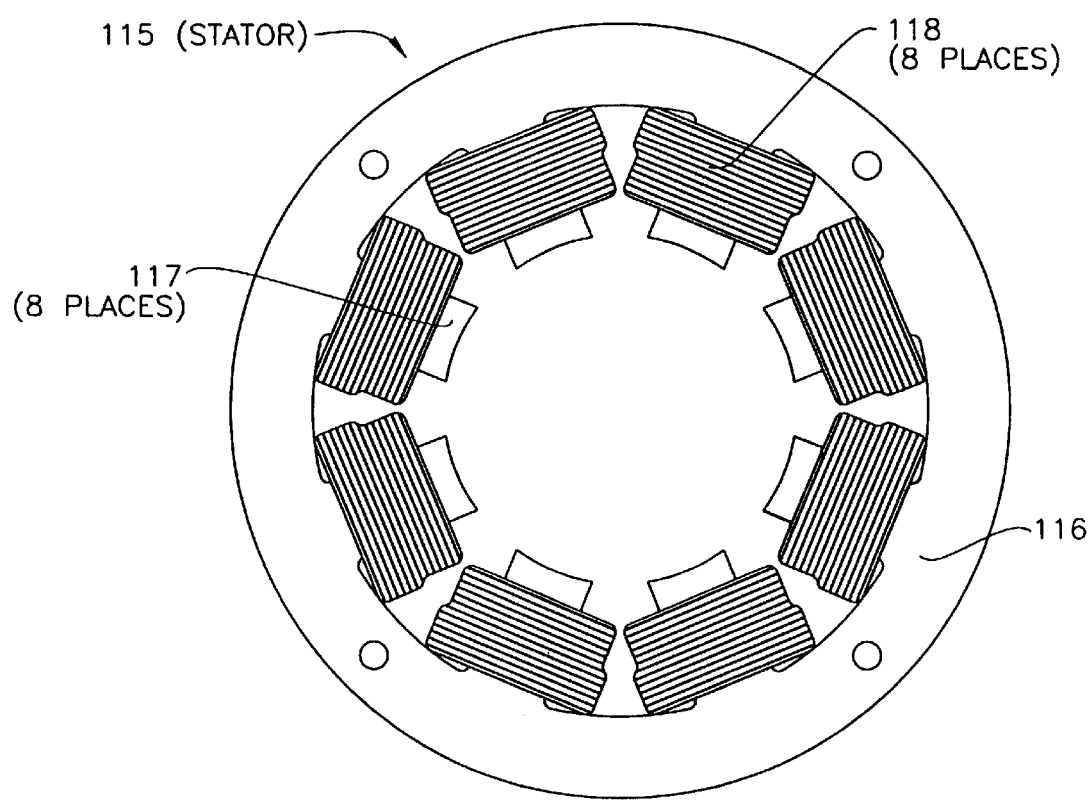
FIG. 3 provides a top view of a radial magnetic bearing associated with the capacitive sensor.
Figure 4:
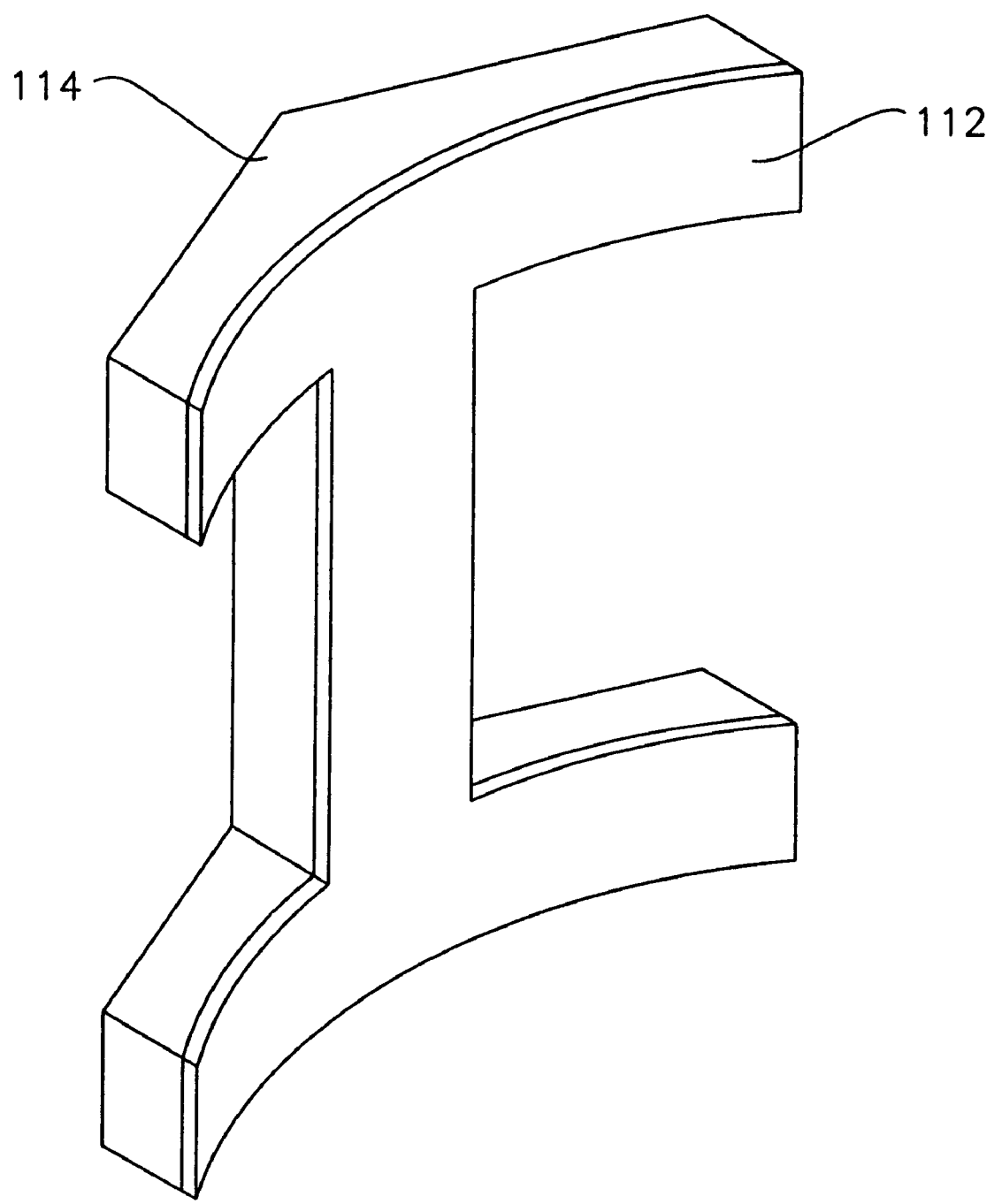
FIG. 4 shows a radial capacitive sensor element.
Figure 5:
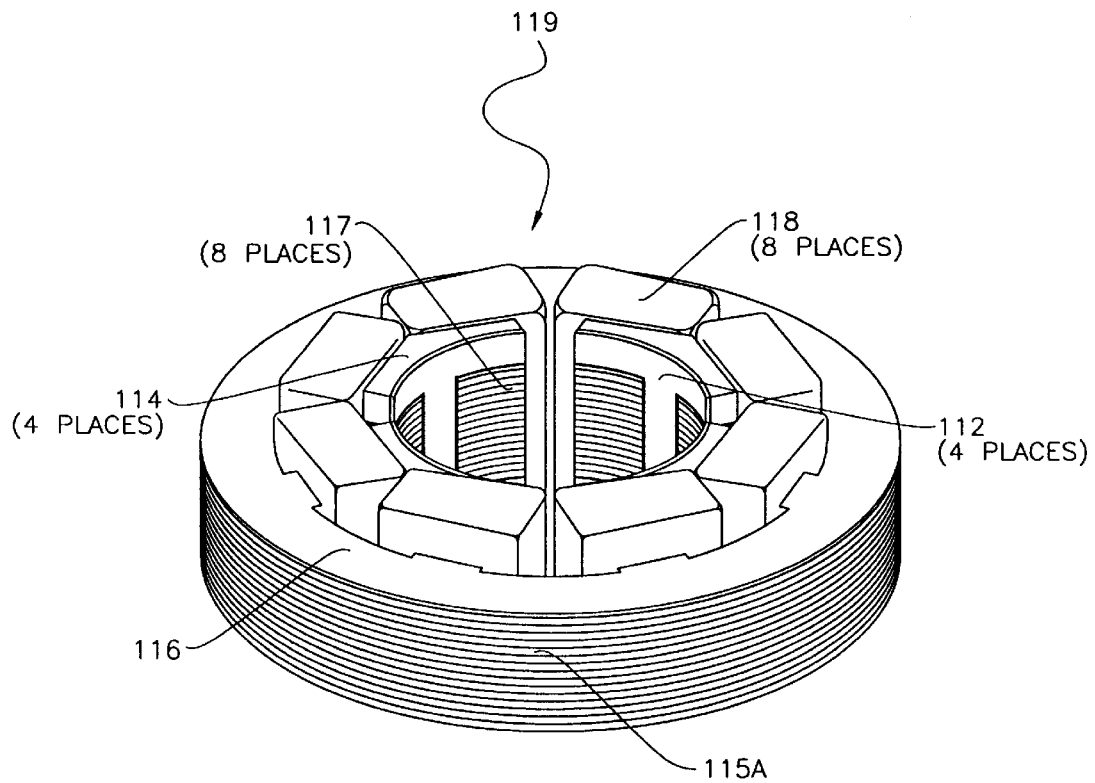
FIG. 5 shows the integration of a radial capacitive sensor illustrated in FIG. 4 into the radial magnetic bearing of FIG. 3.

The stator 115 for a radial bearing 10, illustrated in FIG. 3, is composed of a stack of magnetic steel laminations 115A (illustrated in FIG. 5) and includes an outer ring portion 116 having eight teeth 117, each of which is enclosed by a coil of wire, i.e., winding, 118. It will be appreciated that adjacent pairs of teeth create a magnetic force when current is supplied to their associated coils, with the direction of this magnetic force being midway between the teeth. FIG. 4 shows a radial sensor element 112 while FIG. 5 shows how radial sensor element 112 fits between two of the teeth 117 for the axial extent of the stator 115, and provides additional sensing area beyond the stator 115, but within the axial space occupied by the windings 118. Thus, no additional space in the axial direction is required for the radial sensor 112. All of the space along the shaft 20 is occupied by essential elements of the flywheel 1001, as shown in FIG. 2A, so that providing separate axial locations for the radial sensors would require a longer and heavier shaft, and a larger and heavier enclosure for the flywheel 1001.

Figure 6A:
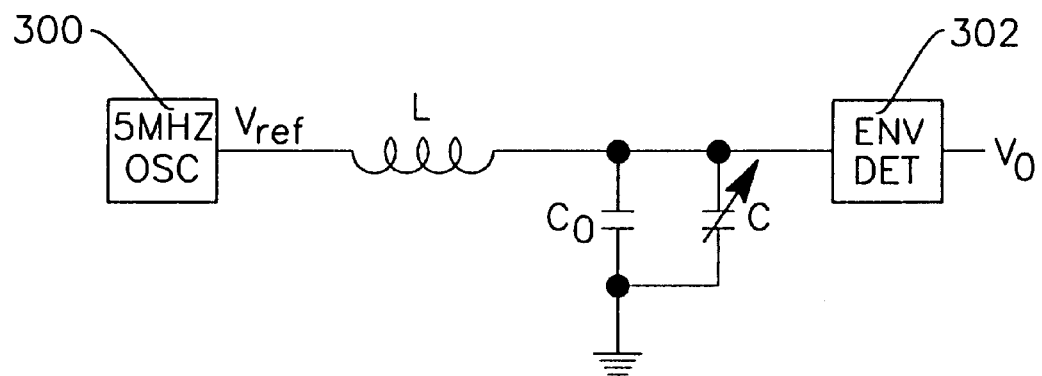
FIG. 6A and 6B are partially schematic, partially block diagrams of alternative capacitive sensor systems incorporating the capacitive sensor in a magnetic bearing system according to the present invention
Figure 6B:
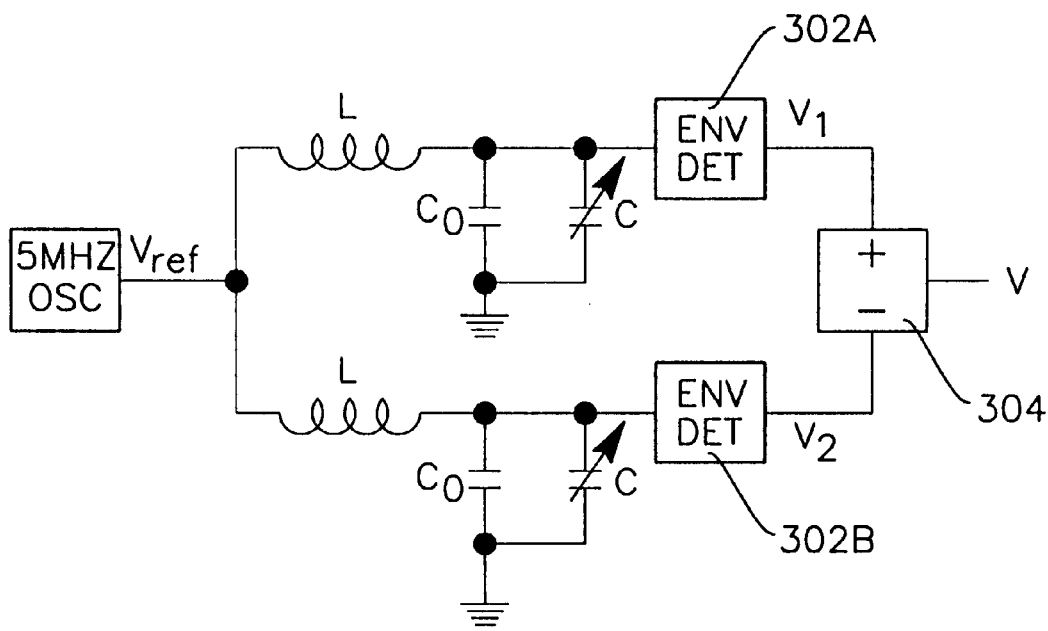

Referring now to FIGS. 6A and 6B, the sensing system for each of the two orthogonal axes of the radial magnetic bearing 110 consists of two identical sensor elements 112 on opposite sides of the stator 115 and, thus, separated by shaft 20. Each sensor element 112 has capacitance to the rotating shaft 20 which is inversely proportional to its radial distance from shaft 20. For the undisturbed rotor position, this distance is designated g, and the capacitance is designated C. If the rotating shaft 20 is displaced a distance x from this position, the X axis sensor in the +X direction will have a capacitance with respect to the shaft $C_1$ (x) equal to $Cg/(g-x)$ and the sensor in the −X direction will have a capacitance with respect to the shaft $C_2$ (x) equal to $Cg/(g+x)$. The capacitance of a sensor element 112 to the stator 1 15 is designated $C_0$. It will be appreciated that the capacitance of the rotating shaft 20 to ground is very large compared to the others, effectively grounding the rotor. Stated another way, the capacitive sensor element 112 acts as one plate in a conventional capacitor, the opposing plate being formed by an adjacent portion of the shaft 20, which shaft is coupled to ground.

A sensor signal processing circuit for the axial bearing system is shown in FIG. 6A. The sensor element 112 is connected to a high frequency oscillator 300 which, in an exemplary case is a 5 MHz oscillator, by an inductance L. The transfer function of this circuit is:

$$Vo/Vref = 1/\{1 - L[C_0 + C(x)]T^2\} \quad (1)$$

where Vo is the output voltage of envelope detector 302, Vref is the output reference voltage of oscillator 300, and T is the frequency divided by $2\pi$. When the inductance L is resonated with $C_0$ at the oscillator frequency, the product of L and $C_0$ is $1/T^2$. Thus, the transfer function reduces to $$Vo/Vref = -1/LC(x)T^2 \quad (2)$$

$$= (x-g)/LCgT^2 \quad (3)$$

$$= (x-g)C_0/Cg \quad (4)$$

The output signal Vo is seen to be linearly related to the shaft 20 displacement x. This intrinsic linearity results from the resonance of L with $C_0$. Stated another way, the linearity of sensor output with shaft 20 position is an intrinsic property of the processing electronics, which inductively tunes out any stray capacitance from the capacitance sensor system.

As shown in FIG. 6B, identical circuits are connected to opposing radial sensors 112, and their outputs are detected, yielding signals designated $V_1$ and $V_2$. By subtracting $V_2$ from $V_1$ in subtractor 304, the detected sensor signal becomes $$(V_1 - V_2)/Vref = (2x/g)(C_0/C) \quad (5)$$

which is zero when shaft 20 is centered and which is proportional to the displacement of the shaft 20 from its central position, as desired. A normalized plot of this signal is shown in FIG. 6C.

Each of the bearings consists of a rotating part, or rotor, and a stationary part, or stator. The rotor 20A, 20B of each respective radial bearing 110, 210 consists of a laminated stack of magnetic steel washer-like elements which surround the solid shaft 20 and provide a low reluctance path for the field produced by the stator. The elements of a radial bearing stator 115 are shown in FIG. 2A and were described above. The stator 115 consists of a stack of laminations 115A of magnetic steel each having eight teeth. Windings 118 surrounding a pair of adjacent teeth 117 of the stator 115 are connected in series in the sense that, when excited by a control current, as described in greater detail below, magnetic flux is driven across the radial gap in a local loop that includes the rotor 20A, 20B washers. This magnetic flux creates a force directed midway between the teeth 117. The vector addition of the forces available from the four pairs of teeth 117 provides a force in any desired direction in the plane perpendicular to the rotor 20 axis.

Preferably, signal processing amplifiers perform the operations on the sensor signals, i.e., the output signals produced by the circuitry illustrated in FIG. 6B, for example, needed to achieve the required bearing stiffness in the response times essential for the mobile environment. Before describing this circuitry in detail, a brief discussion of rotor dynamics will first be presented.

Figure 7A:
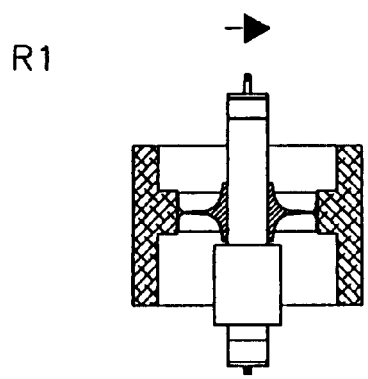
FIGS. 7A through 7F show various radial vibration modes associated with the rotating assembly illustrated in FIG. 2A.
Figure 7B:
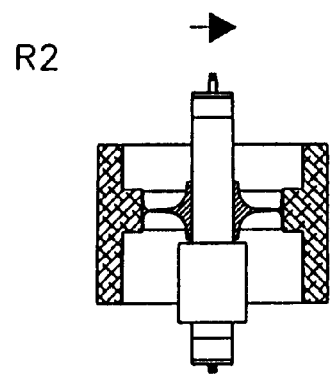
Figure 7C:
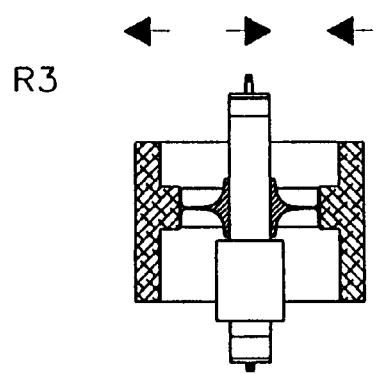
Figure 7D:
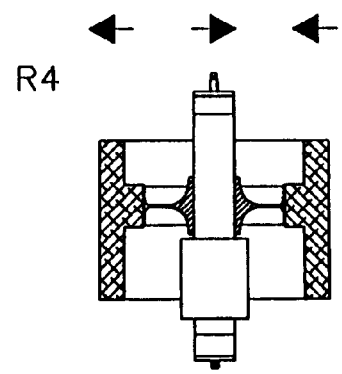
Figure 7E:
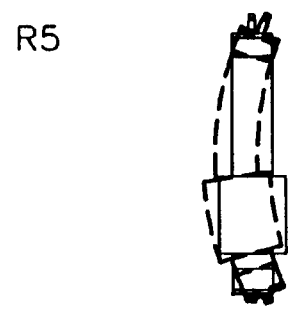
Figure 7F:
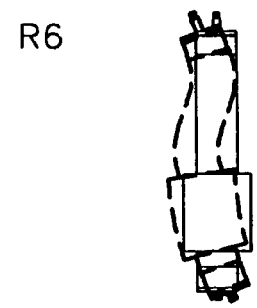
Figure 8A:
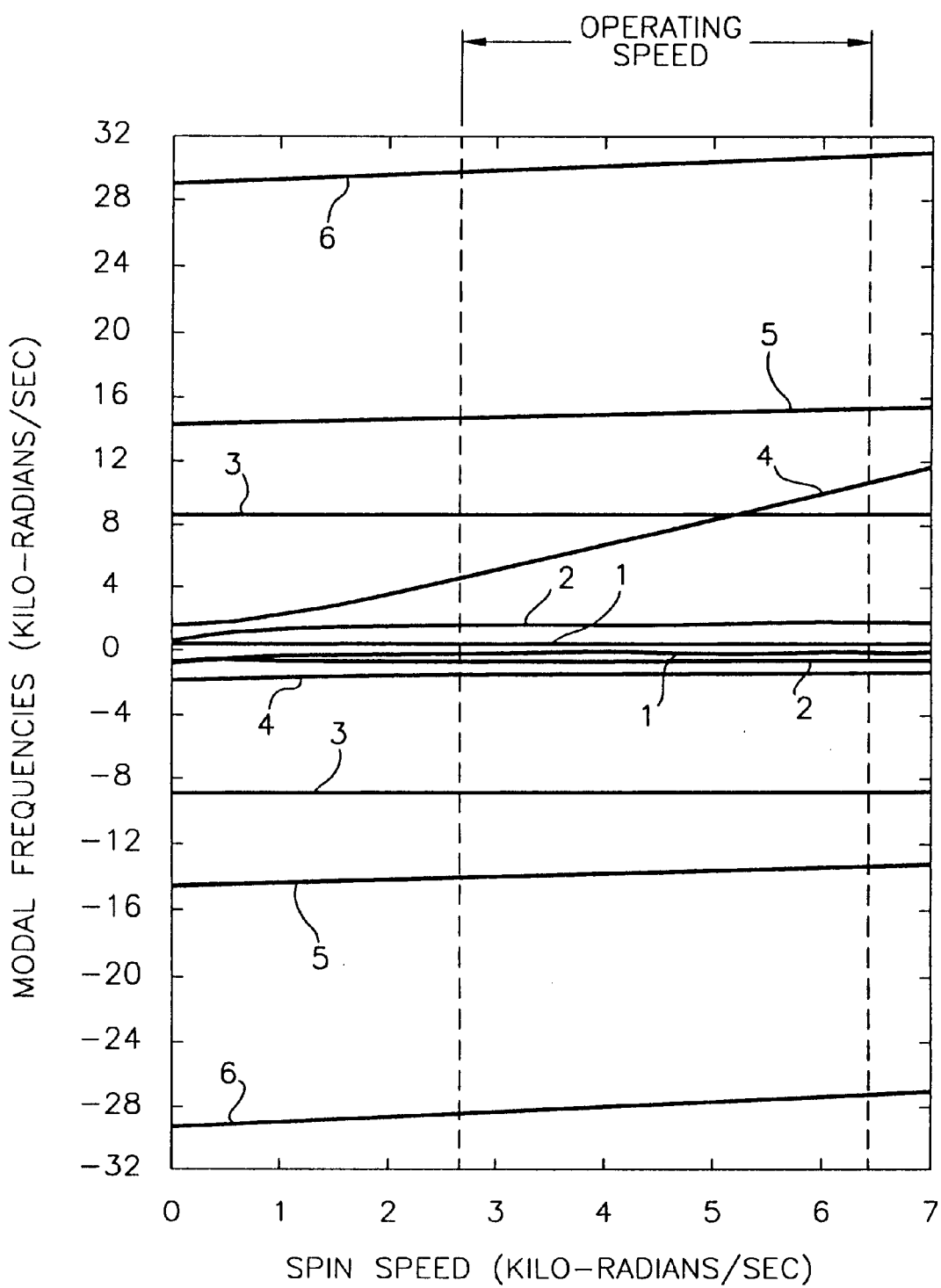

The feedback loop dynamics are complicated rotating assembly I chosen modes of the rotating assembly I whose frequencies lie within the control bandwidth. The elements of the rotating assembly I of the flywheel 1001, as shown in FIG. 2A, are the composite cylinder 10, a transition ring 12, a metal hub 14 and the shaft 20. The compliance of the shaft 20 and the hub 14 creates several flexible body modes in the frequency band of interest. The vibration modes interacting with the radial control system are shown in FIGS. 7A through 7F, and their frequencies as a function of rotation speed are shown in FIG. 8A. More specifically, FIG. 7A illustrates rigid body translation in a direction perpendicular to the axis of rotation (mode R1), FIG. 7B illustrates rigid body rotation about a point, e.g., about the center of mass of the rotating assembly 1 (mode R2), FIG. 7C denotes flexible body translation (mode R3) while FIG. 7D depicts flexible body rotation (mode R4). Moreover, FIGS. 7E and 7F illustrated first and second shaft bending modes, respectively, which may best be understood as simple bending (mode R5) and sinusoidal bending (mode R6).

The variation of the frequencies with spin speed are due to gyroscopic coupling, which is substantial for the modes, i.e., modes 3 and 4, involving coning motion, i.e., a tilt of the axis of rotation which when revolved forms conical surfaces. It should be noted that in FIG. 8A, a positive sign for a modal frequency indicates coning motion in the same direction as the spin; a negative sign implies coning motion in the opposite direction.

Figure 9:
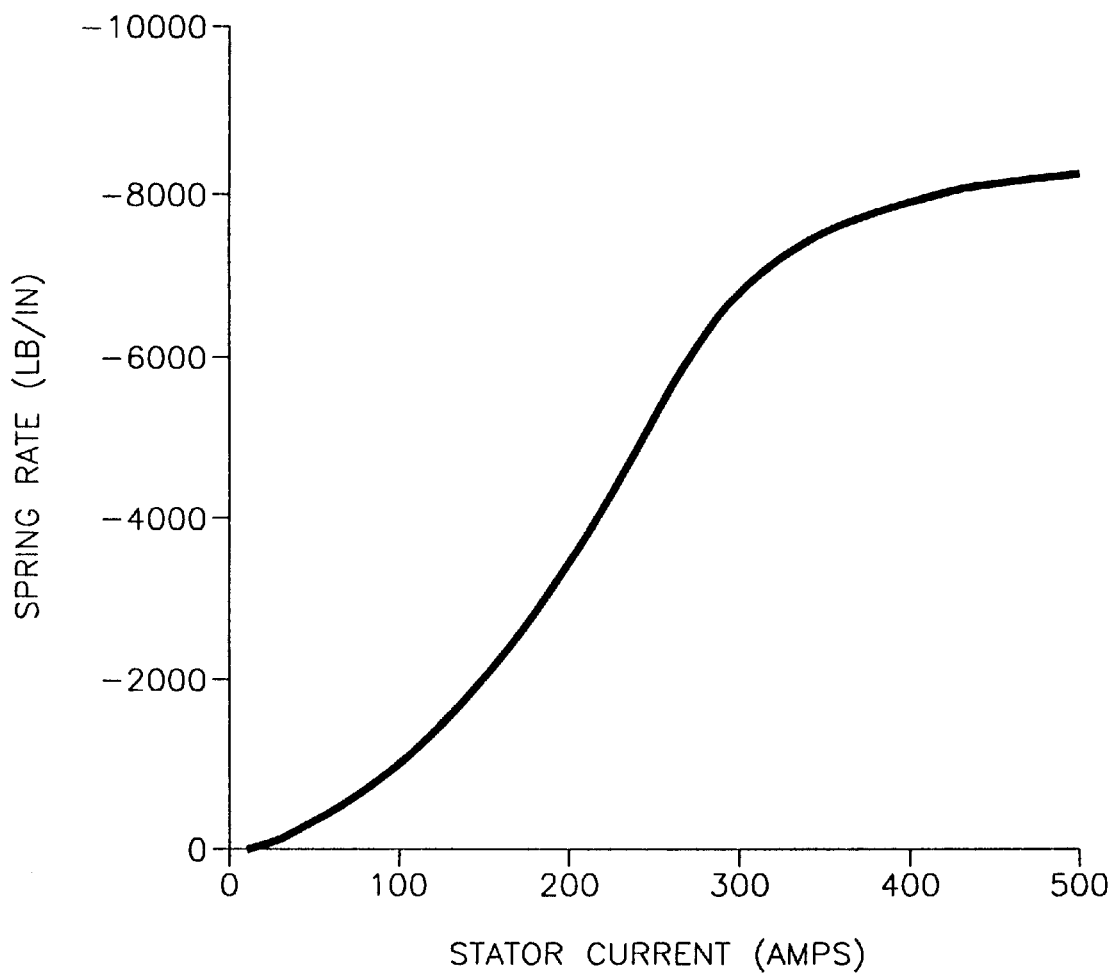
FIG. 9 shows the radial negative spring rate of the motor-generator as a function of stator current.

It will also be noted that the stiffness of the bearing is the ratio of the restoring force produced by the force generators 119 in stator 115 to the displacement of the rotor 20A, 20B from its desired position. The required stiffness is determined by the vehicle accelerations, and also, in the case of the radial bearings 110, 210 by the radial forces developed by the motor-generator 15, as shown in FIG. 9, which must be overcome by the bearing forces. The requirement for the exemplary case discussed above is on the order of 10,000 pounds of force per inch of displacement, for each bearing axis. It should be noted that, with this magnitude of feedback required, the effect of the vibration modes of the rotating assembly 1 on the control stability is substantial.

Figure 10:
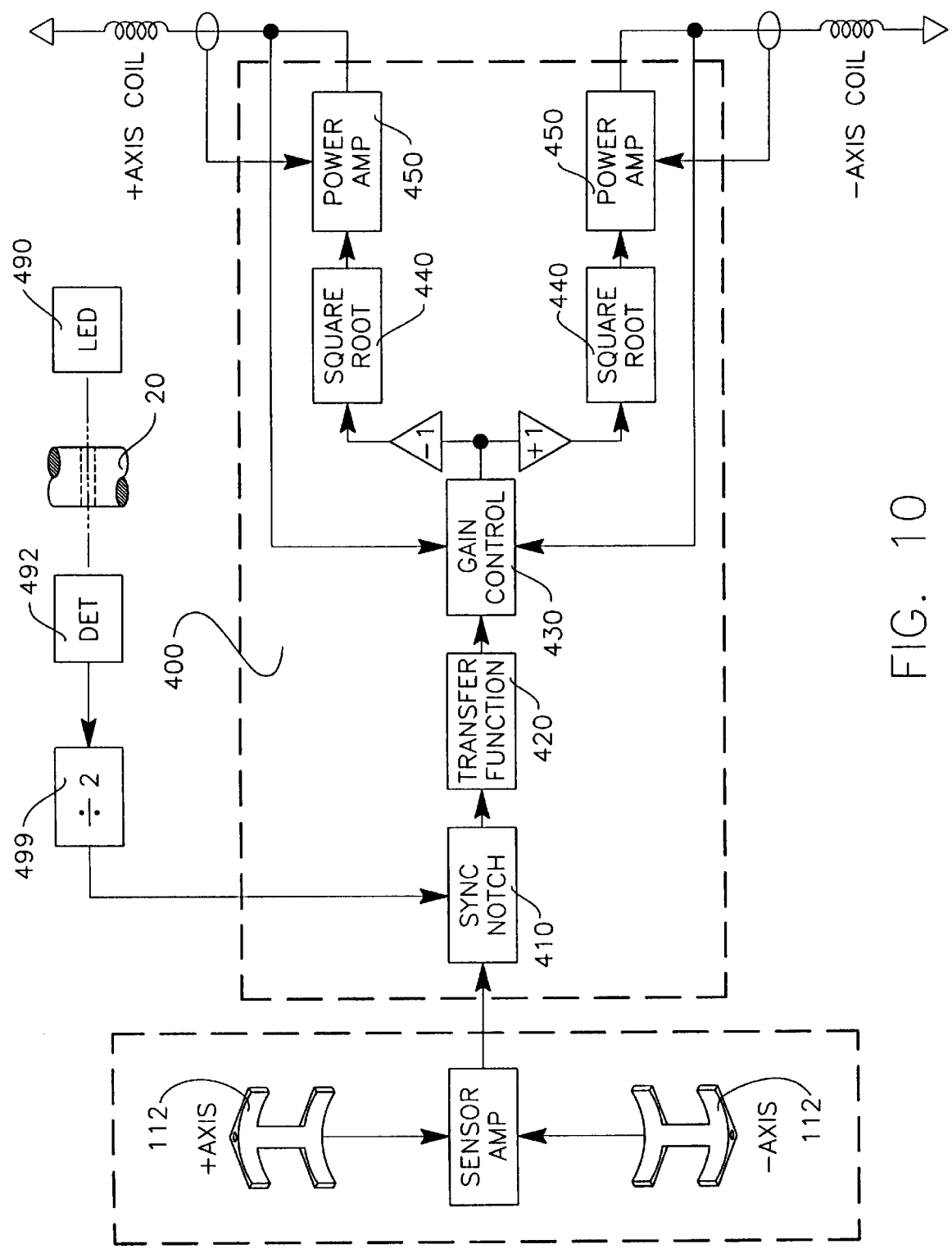
FIG. 10 is a high level block diagram of the radial control electronics according to a preferred embodiment of the present invention.

FIG. 10 is a high level block diagram of the radial bearing control electronics system 400 according to a preferred embodiment of the present invention. Preferably, radial bearing control electronics system 400 includes of a synchronous notch filter 410, which advantageously can be engaged in the desired operating speed range, a transfer function circuit 420, which dynamically stabilizes the control system, a gain control circuit 430, which limits undesirable high amplitude oscillations, a pair of square root circuits 440, which compensate for the magnetic force generator 119 non-linearity, and a pair of power amplifiers 450, which drive current through the coils 118 of the force generator 119.

It will be appreciated that the radial bearing power amplifiers 450 must deal with synchronous signals generated at spin speeds by residual unbalance and that this could saturate the power amplifiers 450 at spin speeds in a predetermined operating range. The synchronous notch filter 410 advantageously can be used in the operating speed range, which in this design extends from 40% maximum speed to the maximum speed, to eliminate these signals from each power amplifier 450. Preferably, the signal corresponding to shaft speed is generated, in an exemplary case, by a light emitting diode (LED) 490 and an opposing photodetector 492 disposed on either side of shaft 20, which shaft includes a bore for transmitting light generated by the LED 490 to the photodetector 492 twice per revolution of shaft 20. Advantageously, the signal generated by photodetector 492 is converted into a shaft speed signal received by notch filter 410 by an amplifier 494.

Figure 11:
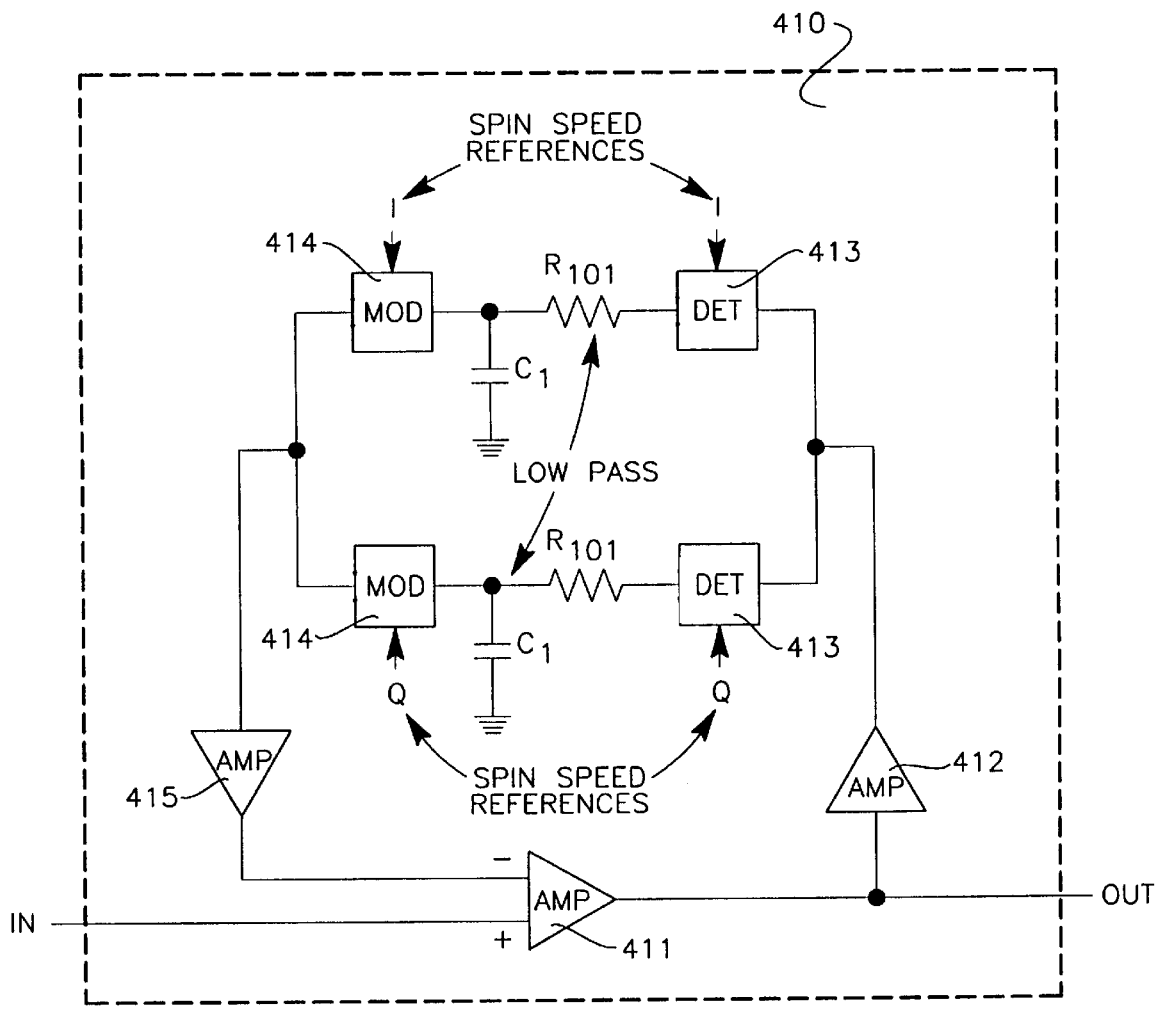
FIG. 11 is a schematic diagram of the synchronous notch filter illustrated in FIG. 10.
Figure 12A:
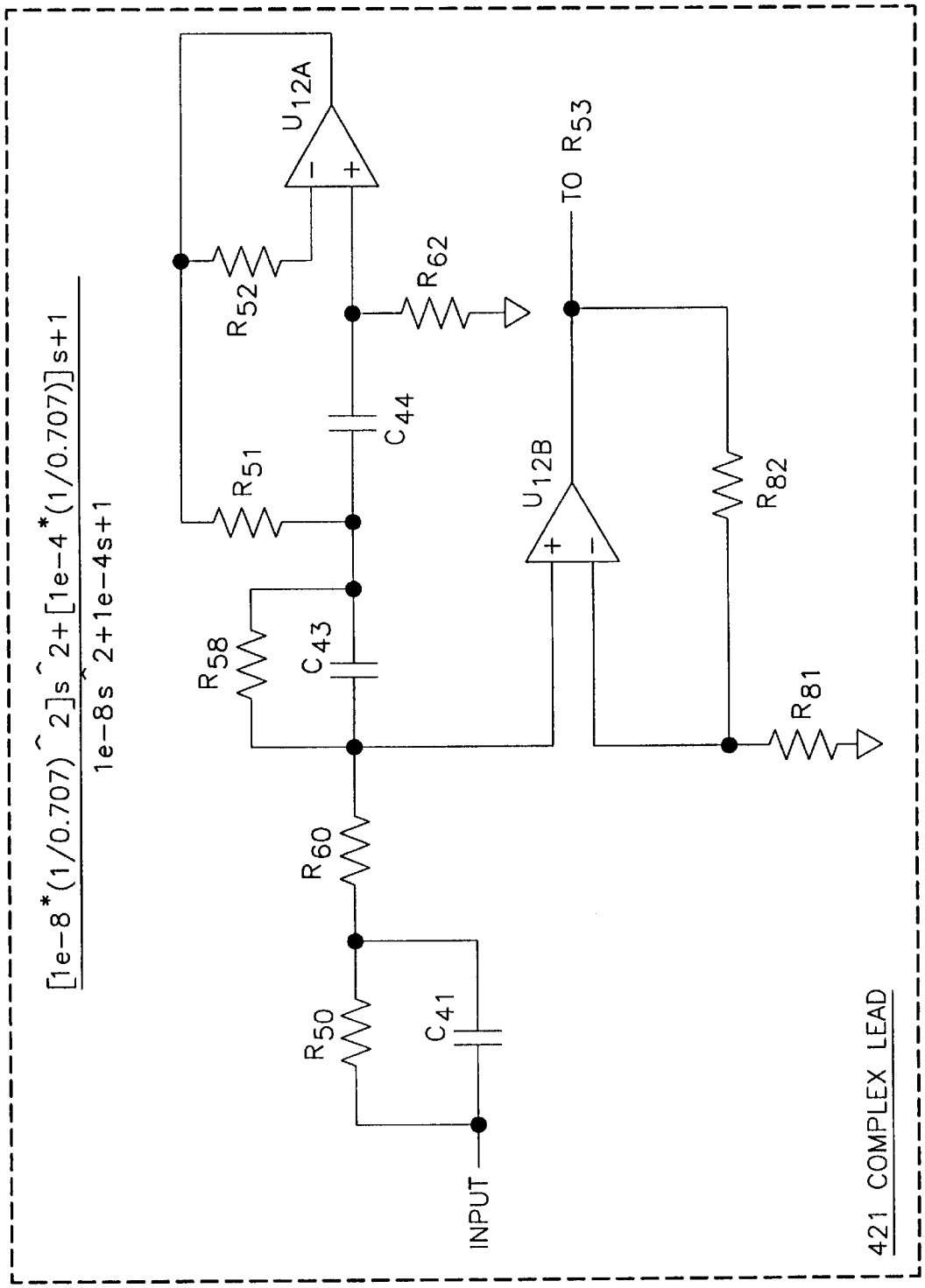
FIGS. 12A through 12D illustrate exemplary circuitry for providing preferred discreet transfer functions employed in the radial control electronics depicted in FIG. 10.
Figure 12B:
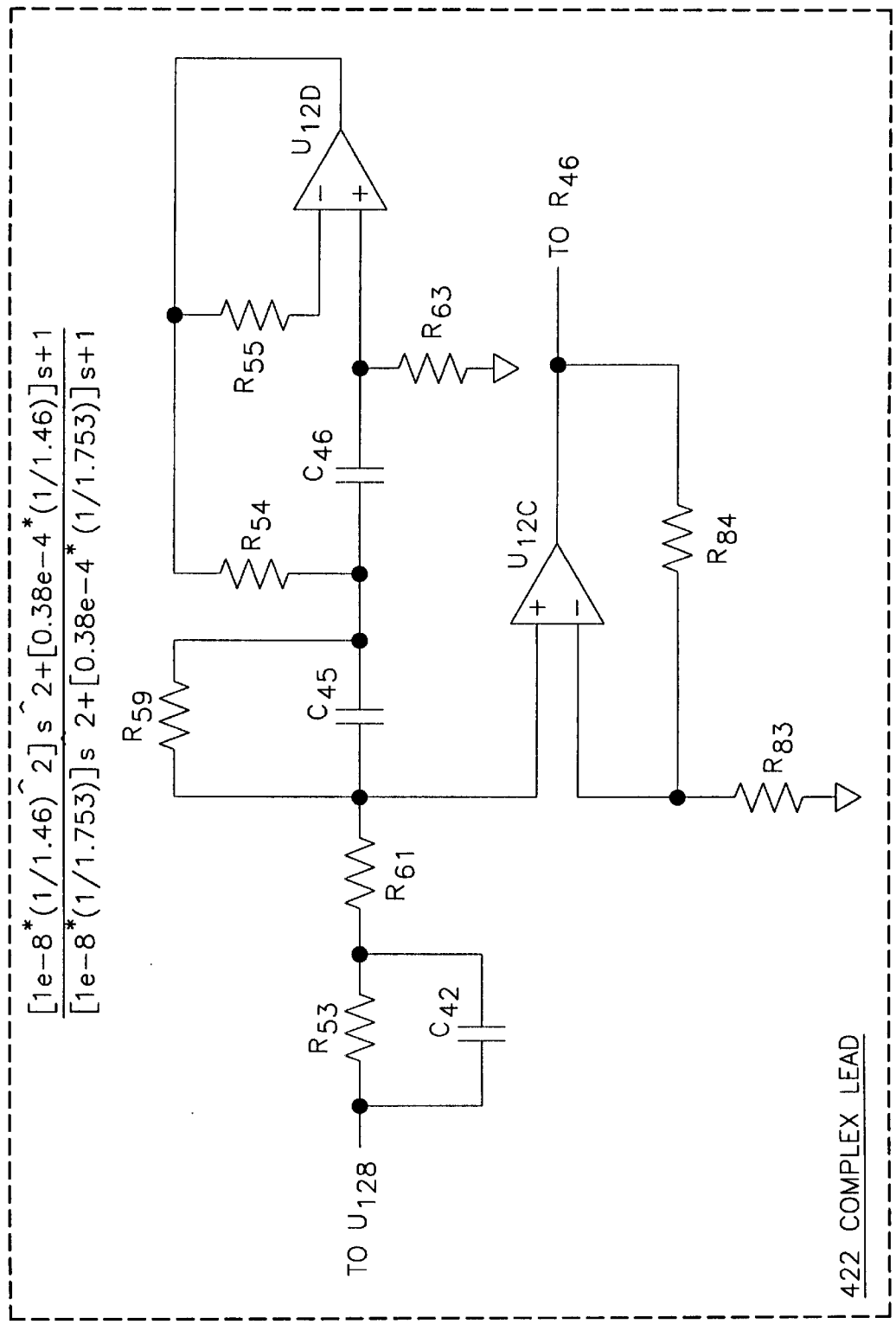
Figure 12C:
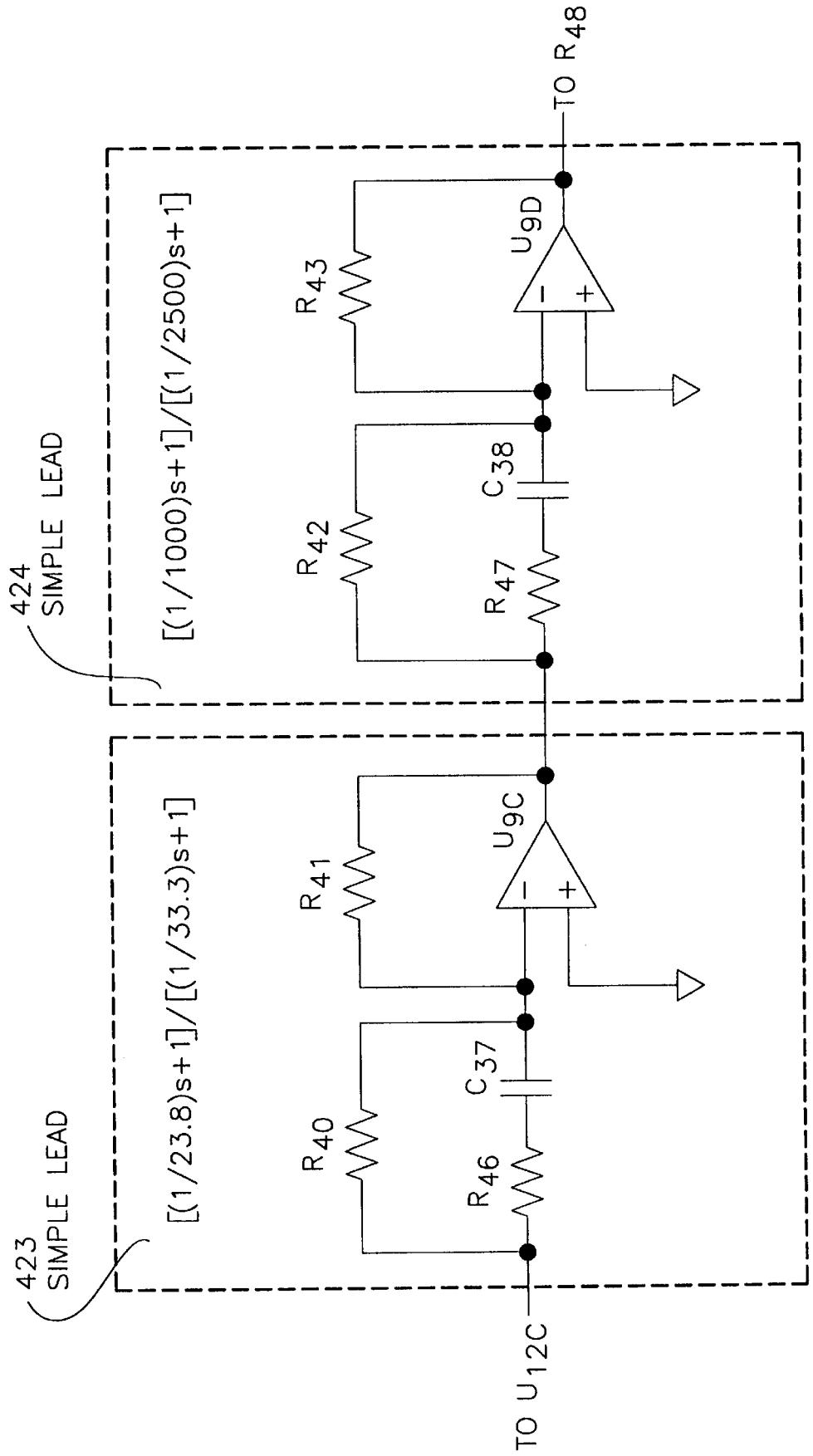
Figure 12D:
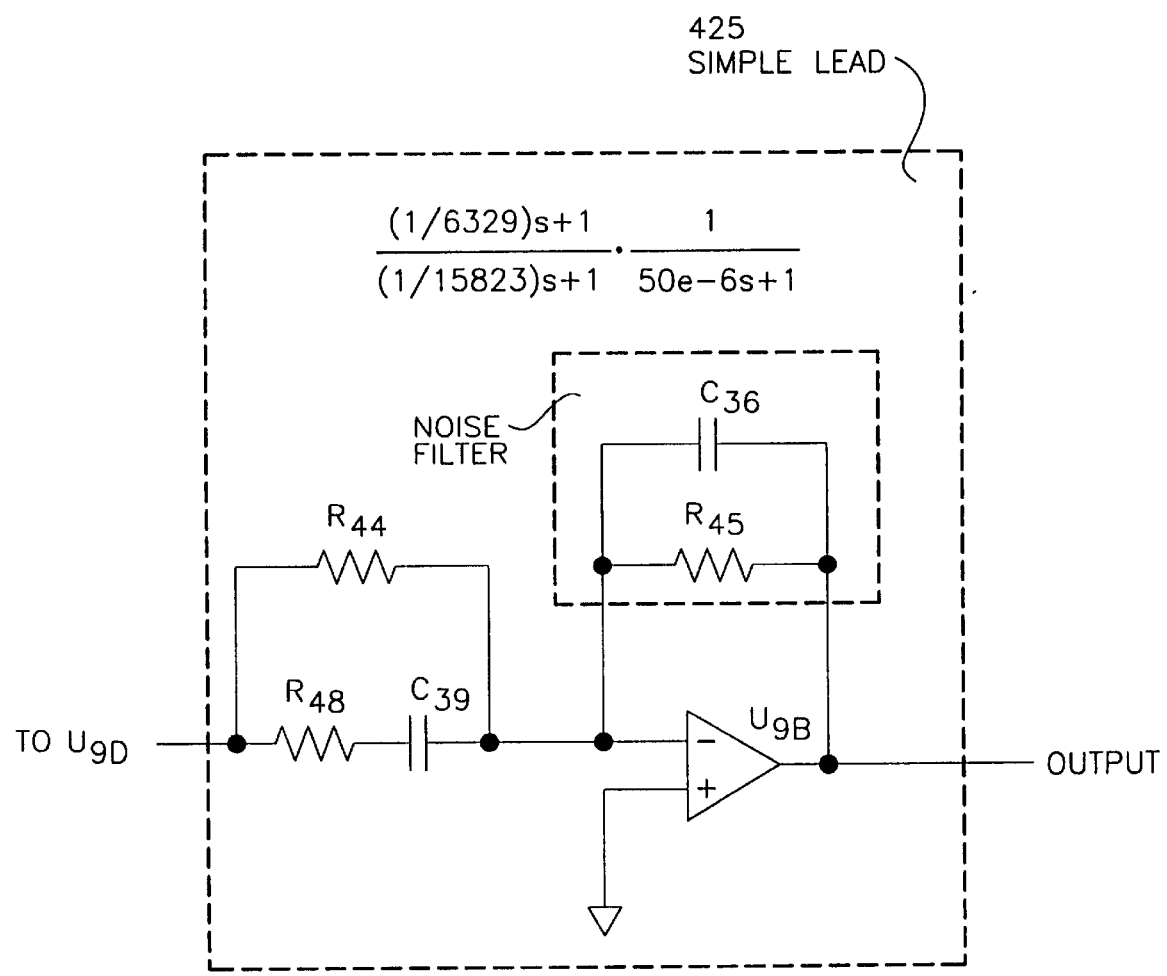

A block diagram of an exemplary synchronous notch filter 410 for the radial bearing control electronics system 400 is shown in FIG. 11. Preferably, synchronous notch filter 410 includes a differential amplifier 411 and amplifiers 412 and 415, arranged in a loop. Advantageously, the output of amplifier 412 is connected to parallel circuit brances, each including a detector 413, a resistor $R_{101}$, a node and a modulator 414, where each node is connected to ground via a capacitor $C_1$. Preferably, the components in one branch receive a signal corresponding to the component I of the spin speed while the other parallel branch receives a signal corresponding to the component Q of the spin speed. The outputs of these parallel branches are added and then amplified by amplifier 415, thereby producing a synchronous component.

It will be appreciated that by subtracting the synchronous component from the composite signal by means of a high gain feedback loop which uses shaft speed as a reference for its detectors 413, more than 50 db of synchronous signal rejection is achieved over the operating speed range. It is to be noted that the synchronous notch filter 410 must be removed in the lower speed regime, which contains only the rigid body modes, i.e., modes 1 and 2. The damping of modes 1 and 2 requires synchronous frequency feedback when they are traversed during rotor spin up to, or spin down from, the operating speed range of rotating assembly 1.

It should be mentioned that the preferred technique used to deal with the vibration modes of the rotating assembly 1 is to provide positive damping for all of the modes for which the loop gain is much greater than unity via a suitable phase lead network. It will be appreciated that ordinary techniques for creating phase lead over such a wide range of frequencies, more than one hundred to one, would result in such a high value for the high frequency gain of the network that extraneous signals, such as the high frequency switching components of the motor-generator currents, which may be picked up by sensor amplifiers in close proximity thereto, would saturate the power amplifiers 450 driving the force generators 119. An elegant solution to this problem is use of a plurality of relatively low gain phase lead networks incorporated into transfer function circuit 420.

Figure 13A:
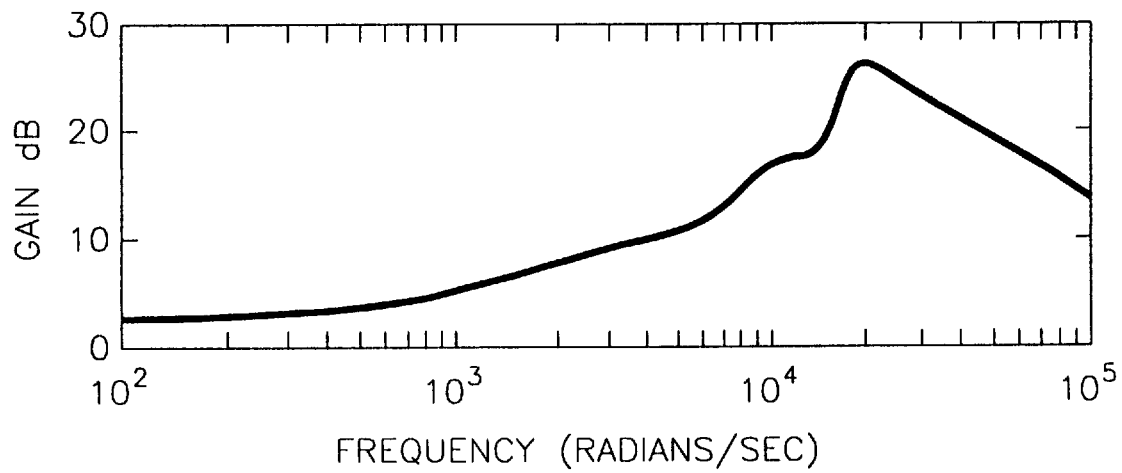
FIGS. 13A and 13B show the amplitude and phase, respectively, of the transfer function provided by the circuitry of FIG. 12.
Figure 13B:
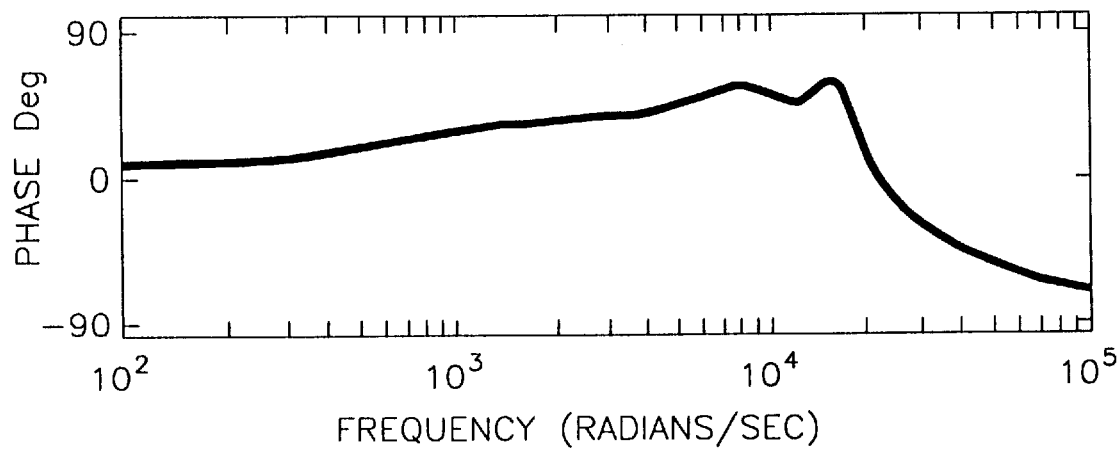

Referring to FIGS. 12A through 12D, which collectively constitute FIG. 12, the transfer function circuit 420 advantageously includes five lead networks, three non-contiguous simple phase lead networks 423, 424 and 425, each having a real pole and a real zero, and two non-contiguous phase lead networks 421 and 422 having complex poles and zeroes tuned to provide phase lead at the frequencies of modes 3 and 5 of FIG. 8A. These networks, which are serially connected in numerical order in an exemplary case, are described mathematically and implemented in analog form as shown in FIGS. 12A through 12D. Amplitude and phase plots of the output of transfer function circuit 430 are shown in FIGS. 13A and 13B, respectively. It will be appreciated that comprehension and reconstruction of the circuitry shown in FIGS. 12A through 12D, particularly with the associated transfer function outputs illustrated in FIGS. 13A and 13B, is well within the level of one of ordinary skill in the art; further detailed discussions will not be provided.

Figure 14A:
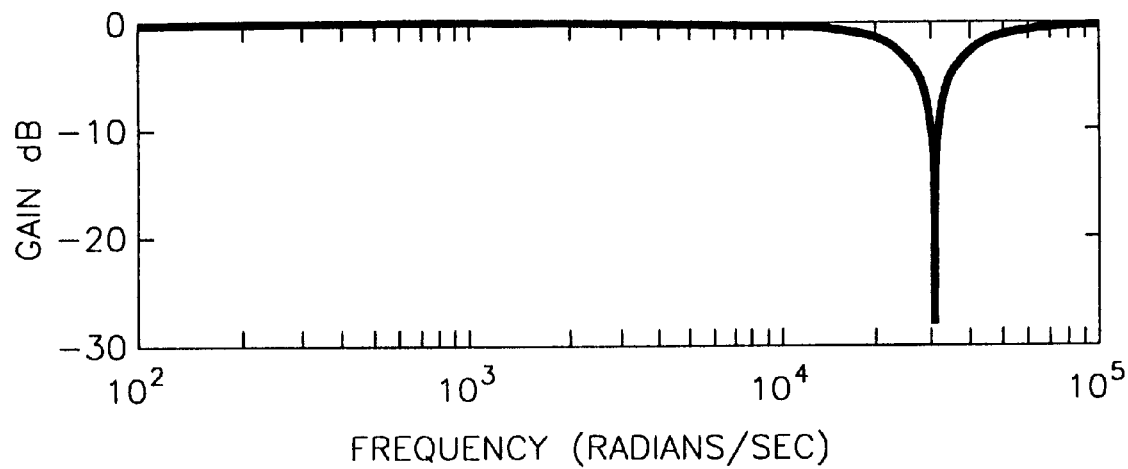
FIGS. 14A and 14B show the amplitude and phase, respectively, of the transfer function of the notch circuit which suppresses the second shaft bending mode.
Figure 14B:
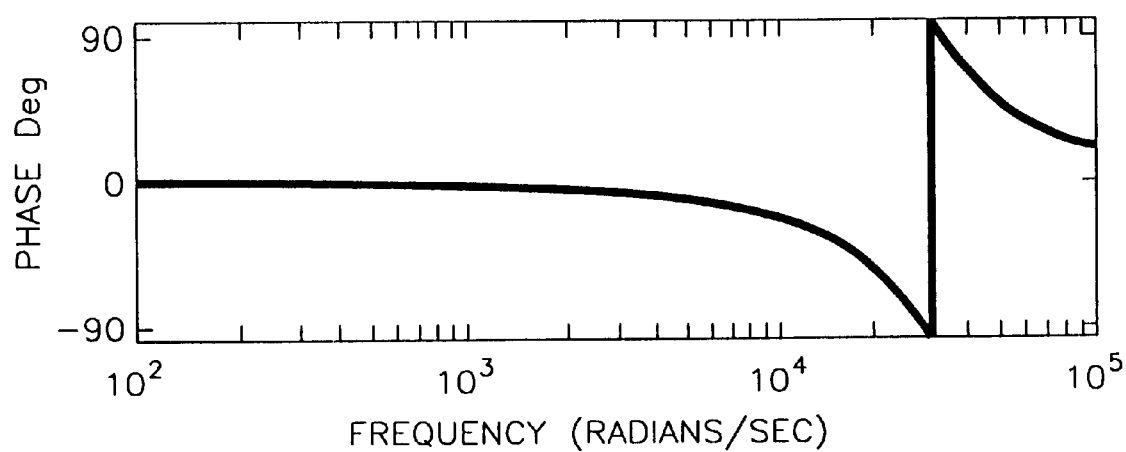

It should also be noted that the highest frequency mode which must be considered is the second shaft bending mode, mode R6 of FIG. 7F, whose resonance frequency is at approximately twice the frequency of the first shaft bending mode, as shown in FIG. 7E. Mode R6 resonance could be damped with another complex phase lead network, at the cost of an increase in gain of about 3 decibels, or nulled with a fixedly tuned notch filter of adequate bandwidth, which would cause some additional phase lag at the frequency of the first bending mode (mode R5). Since the loop gain at this frequency exceeds unity only slightly when adjusted to the desired equivalent spring stiffness, it was found expedient to prevent its excitation by using a notch filter. This filter has the transfer function outputs shown in FIGS. 14A and 14B.

It will be appreciated that the magnetic force generated by the force generators 119 is proportional to the square of the current in the coils, in the absence of a permanent magnet biasing field. Permanent magnets advantageously have been avoided in the radial bearings 110, 120 according to the preferred embodiment of the present invention, since the power loss resulting from the eddy currents generated by the permanent magnets in the rotor 20A, 20B would preclude a long rundown time for the flywheel 1001. A bias current equal to half of the maximum current in each winding 118 would provide a linear net force versus control current for each axis, the net force being the difference in the forces in the positive and negative directions. The provision for this large of a bias current results in an inconveniently high continuous power drain.

Figure 15:
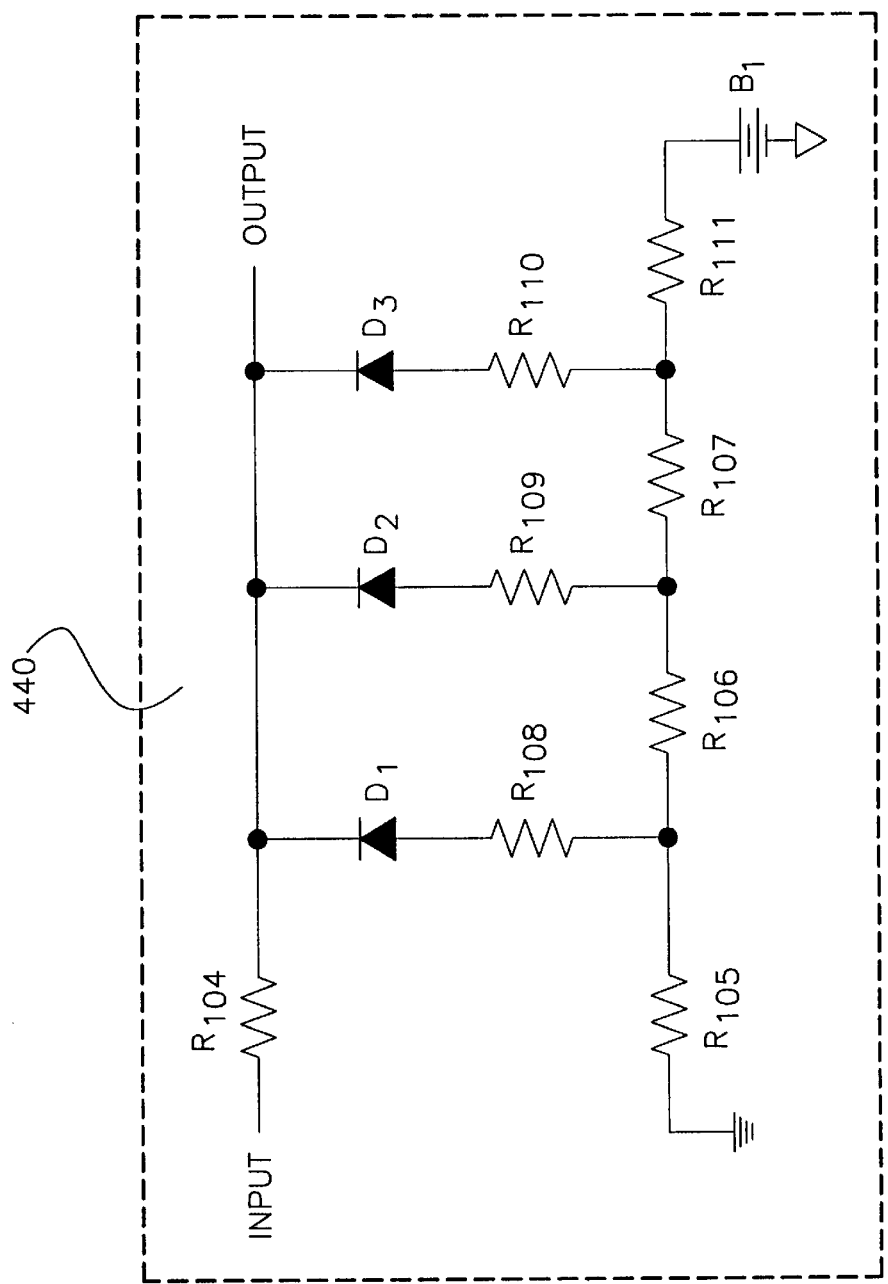
FIG. 15 is a detailed schematic diagram of the square root circuit depicted in FIG. 10.

Advantageously, a linear response can be achieved using the square root circuit 440, which provides a compensating square root function, in series with the power amplifier 450. However, it will be apparent that a complete square root function has an undesirable infinite derivative at zero input. The solution utilized in the square root circuit 440 provides a combined linear and a truncated square root function, in which the square root function does not extend down to zero input where the singularity exists. The linear portion requires a small bias current to provide linearity, in this example one seventh of the maximum current, resulting in an acceptable power drain. An exemplary block diagram of the square root circuit 440 is shown in FIG. 15. Square root circuit preferably includes a resistor $R_{104}$ serially connected between the input and output terminals of the circuit and diodes $D_1$, $D_2$, and $D_3$, which are connected between resistor $R_{104}$ and ground via a network of resistors $R_{105}$ –$R_{111}$. The required bias voltage for circuit operation is provided by a voltage source B1.

Figure 16:
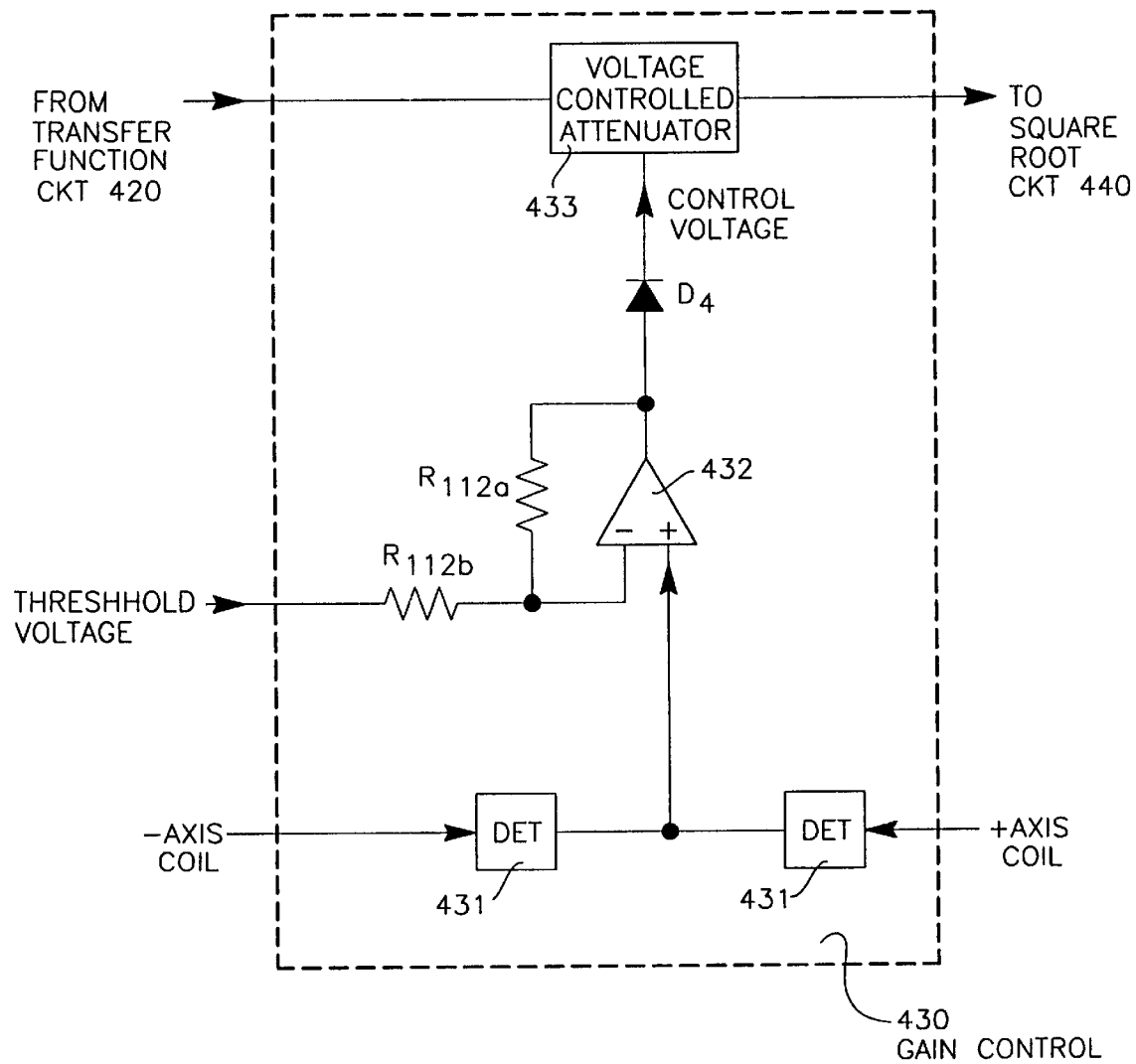
FIG. 16 is a detailed, partially schematic diagram of the automatic gain control circuit depicted in FIG. 10.

The foregoing descriptions of stabilizing the active bearing control system presumes linear behavior of all of the circuit elements (except for the intentional square root function). However, certain high frequency, high level excitations can require rates of change of current in the coils 118 beyond the capabilities of the power amplifiers 450 at the maximum voltage available. This condition introduces additional phase lag in the force generated, resulting in an undesirable high amplitude oscillation. In order to prevent these oscillations from occurring, the automatic gain control circuit shown in FIG. 16 is incorporated into the control electronics system 400 between the transfer function circuit 420 and the square root function circuits 440. The coil voltages on opposing sides of each force generator 119 are detected by detectors 431 and compared to a preset threshold using a comparator 432 suitably conditioned by resistors $R_{112a}$, and $R_{112b}$. A voltage exceeding this threshold is applied to a voltage controlled attenuator 433, which immediately reduces the gain by an amount, in decibels, proportional to this excess, via diode $D_4$. This momentary gain reduction, which is effected by the voltage controlled attenuator 433, quenches the incipient oscillation and solves the rate limit problem.

Figure 17:
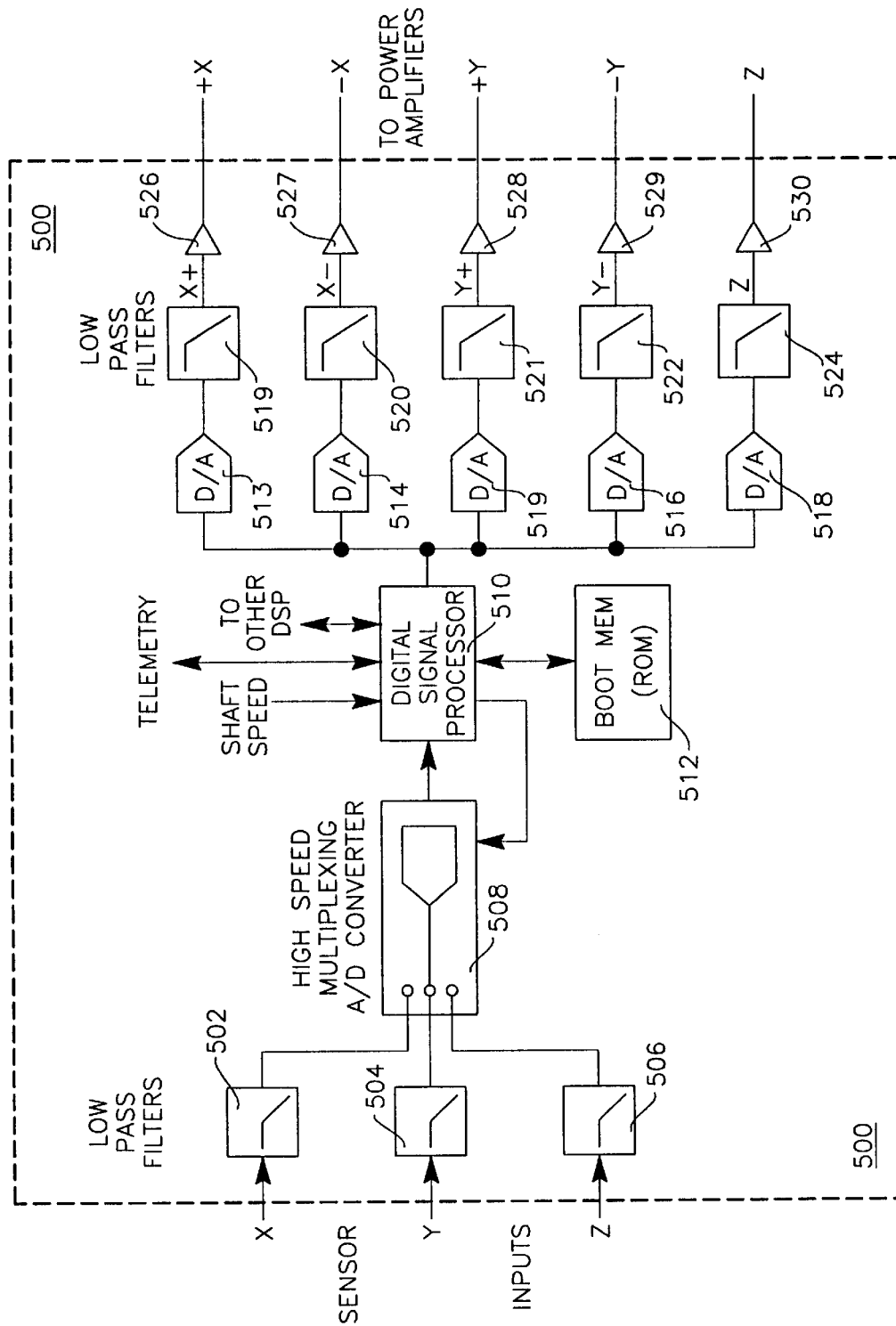
FIG. 17 is a system block diagram of a digital processor according to a preferred embodiment of the present invention.

In order to provide redundancy and for ease of physical implementation, the radial control system is implemented with two independent sets of amplifiers and processors, one of which is shown in FIG. 17. An independent digital signal processor (DSP) 510 and set of amplifiers 526–530 are present in both the upper and lower halves of the flywheel 1001. Preferably, the output stage for the Z (axial) channel, which includes digital to analog converter (DAC) 518, low pass filter (LPF) 524, and amplifier 530 would not be present in the lower half, since only the upper axial bearing 120 includes an active force generator.

In order to provide acceptable control across the required frequency band, i.e., DC to 5 kHz, a high sample rate must be employed. In this preferred embodiment according to the present invention, each analog channel is preferably sampled fifty thousand times per second. As shown in FIG. 17, sampling is accomplished via a high-speed multiplexing analog-to-digital converter (ADC) 508. It should be mentioned that the noise spectrum of the sensors 112 and the sampling rate of the ADC 508 dictate the required performance of the anti-aliasing filters 502, 504 and 506, which are advantageously serially connected between the sensor elements and ADC 508. LPF 502, 504 and 506 are preferably first-order lowpass filters with cutoff frequencies of 100,000 radians per second (rad/s).

In an exemplary case, the digital signal processor (DSP) 510 utilized in FIG. 17 can be a Motorola DSP56303. On power-up of DSP 510, a program is loaded from a nonvolatile read only memory (ROM) 512 and, subsequently, executed at a high rate of speed from an on-chip random access memory (RAM, not shown). Preferably, sensor data is converted to digital words via ADC 508, which advantageously can operate under control of the DSP 510. Advantageously, processing can be carried out entirely within DSP 510, which preferably provides output data to high-speed DACs 513–518. The output of the DACs 513–518 is then provided as control signals to amplifiers 526-530 via reconstruction filters 519–524, respectively. Serial ports in 510 are used to provide communications with another DSP 510 located in the opposite half of the flywheel 1001 as well as telemetry with an external control system.

Figure 18:
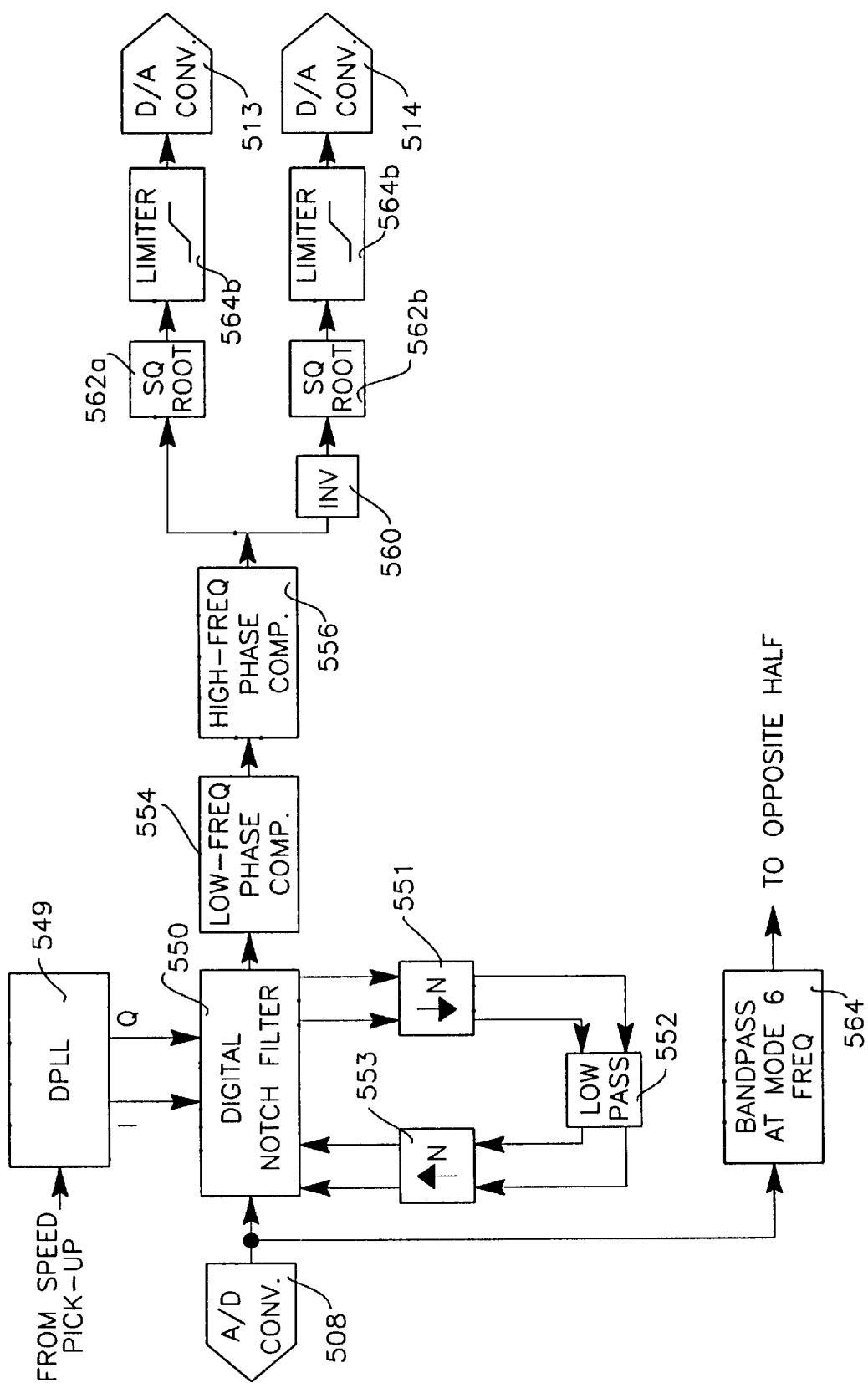
FIG. 18 shows the functions provided by a digital signal processor included in the circuitry depicted in FIG. 17.

The digital processing carried out within DSP 510 for a single radial channel is shown in FIG. 18. After conversion to analog form in ADC 508, the digital signal is applied to a digital notch filter 550, which attenuates the sinusoidal component of the input signal, that signal being synchronous with shaft speed. The operation of this digital notch filter 550 is similar to that of the analog notch filter 410. Preferably, in-phase and quadrature sine waves are derived from the speed pickup by a digital phase-locked loop (DPLL) 549. As the bandwidth of the notch filter 550 is proportional to the bandwidth of the lowpass filter 552 in its feedback loop, it is advantageous to reduce the sample rate of this feedback signal prior to filtering. Decimator 551 reduces the sample rate by a factor of N, along with appropriate bandlimiting. In the digital form of the preferred embodiment according to the present invention, decimation by a factor of twenty advantageously can be used. Low pass filtering is accomplished by digital fitter 552. Preferably, the sample rate of the filtered signal generated by LPF 552 is then increased to the original sample rate by an interpolator 553.

Figure 8B:
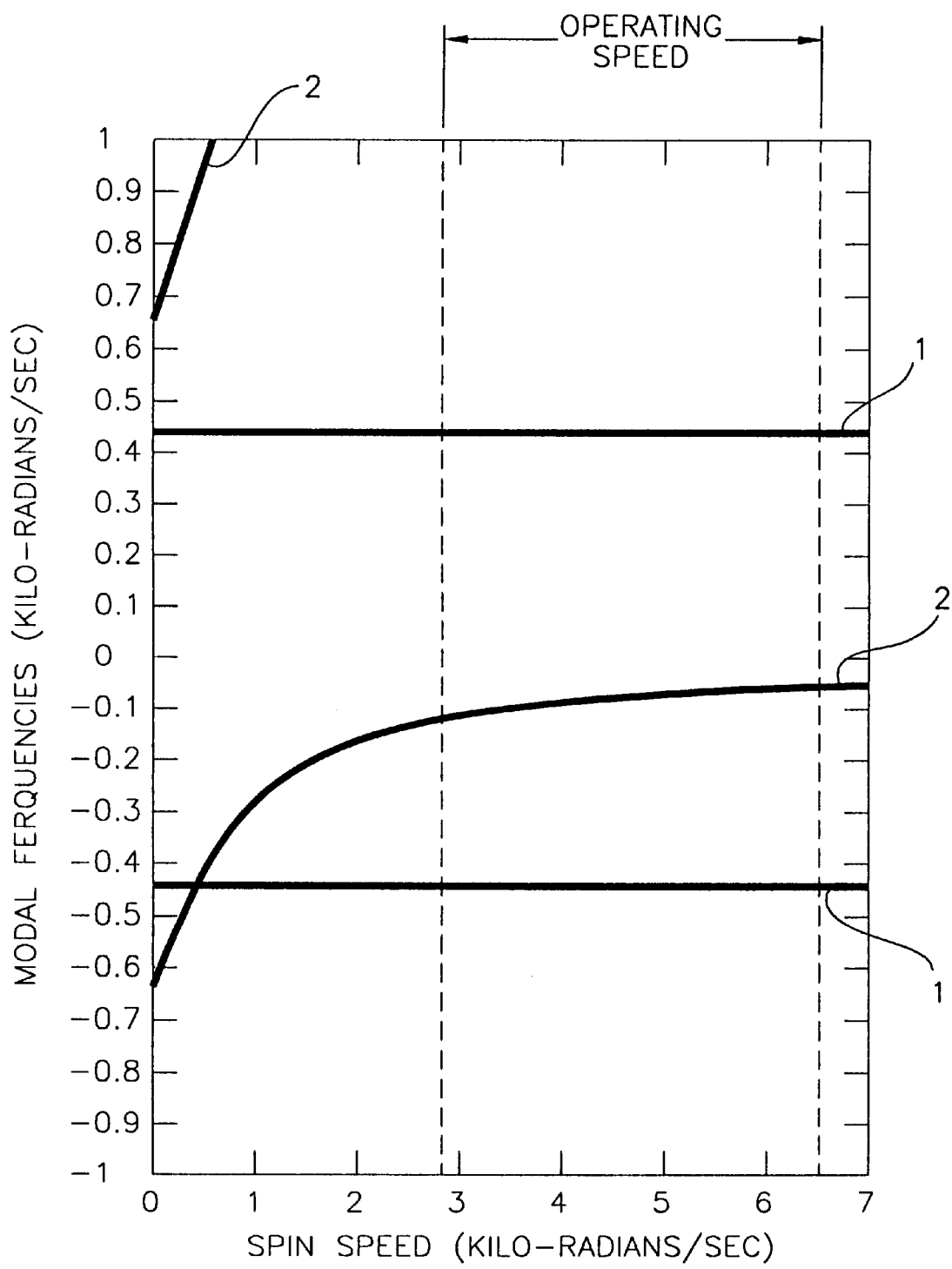
FIG. 8B is an expanded portion of the low frequency range illustrated in FIG. 8A.

Preferably, phase compensation in the functional block diagram depicted in FIG. 18 is provided by digital filters 554 and 556, where 554 is an infinite impulse response (IIR) filter providing low frequency phase compensation for radial mode R2 at high spin speed, as illustrated in FIGS. 8A, 8B, while 556 denotes an asymmetric finite impulse response (FIR) filter providing high-frequency phase compensation and noise filtering of the input signal. The coefficients of the FIR filter correspond to the discrete-time impulse response of the phase-compensation and noise-filtering transfer functions, excluding the low-frequency lead ramp function implemented in 554. In the digital alternative preferred embodiment according to the present invention, a one hundred-tap FIR filter is used, which at fifty thousand samples per second advantageously provides a very close approximation of the transfer-function impulse Referring again to FIG. 18, following the phase compensation functions, the digital signal is preferably applied to two paths. In the upper path illustrated in FIG. 18, the output of FIR 556 is applied to DAC 513 via square-rooter 562a and limiter 564a. In the lower path of FIG. 18, the output of FIR 556 is applied to DAC 514 via inverter 560, square-rooter 562b and limiter 564b.

Figure 19:
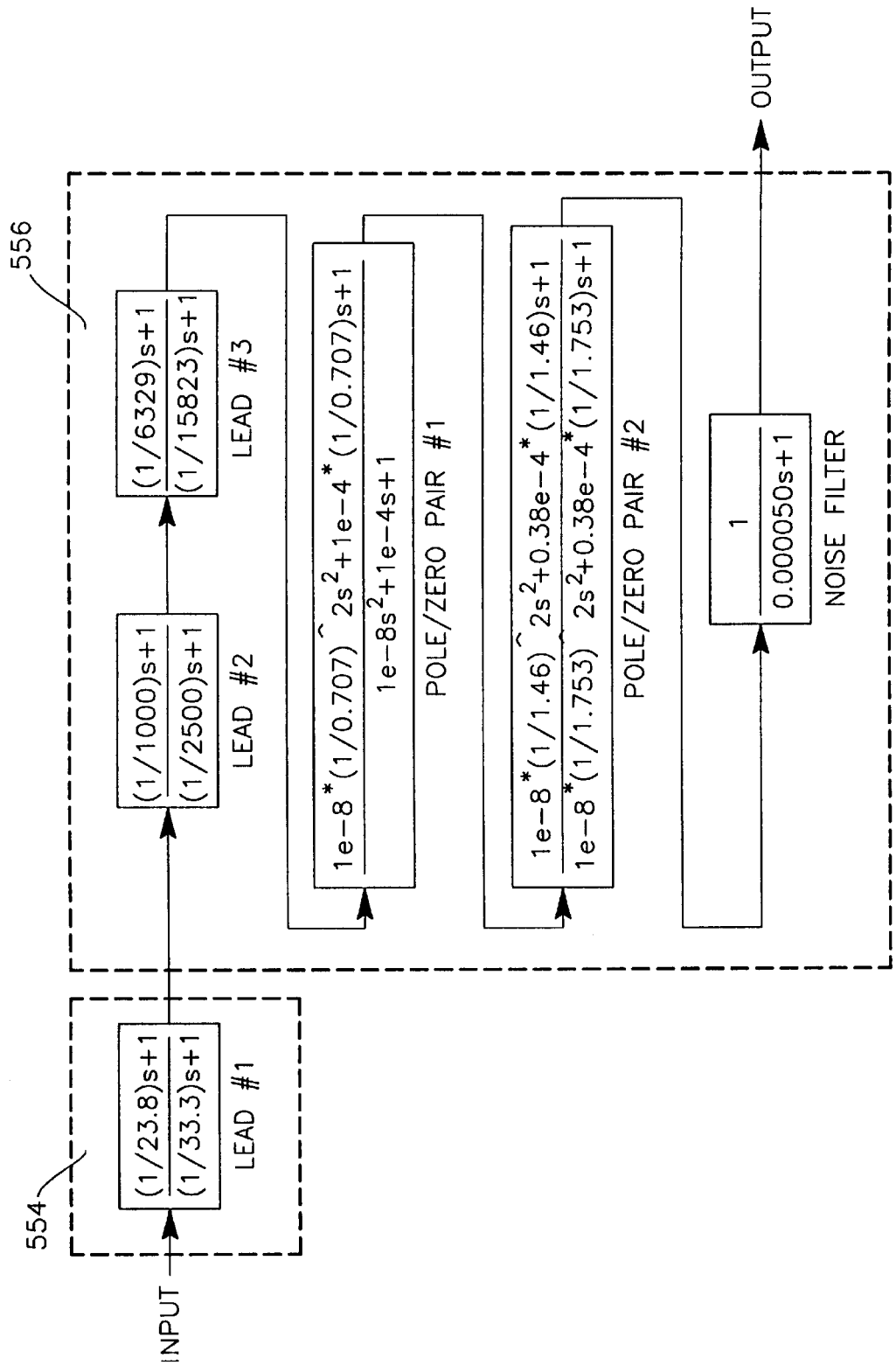
FIG. 19 illustrates, in block diagram form, synthesis of the transfer function employed in FIG. 10.

It will be appreciated that the functional blocks between the ADC 508 and DACs 513, 514 illustrate the overall signal processing carried out by DSP 510 in FIG. 17. The transfer function provided according to FIG. 18 is further illustrated in the functional block diagram of FIG. 19.

Preferably, each half of flywheel 1001 contains a single DSP 510 and each DSP 510 simultaneously processes two radial channels. As discussed above, only one of the DSPs 510 processes an axial channel. It will appreciated that the less stringent processing requirements of the axial control loop, which preferably are carried out only by the upper DSP, can be readily understood and implemented by one of ordinary skill in the art and, for that reason, will not be discussed further. As the DSP 510 advantageously can be implemented using CMOS technology, power consumption of DSP 510, and hence the entire control circuitry, can be reduced by reducing the instruction rate when appropriate, i.e., between sample processing times.

Figure 20:
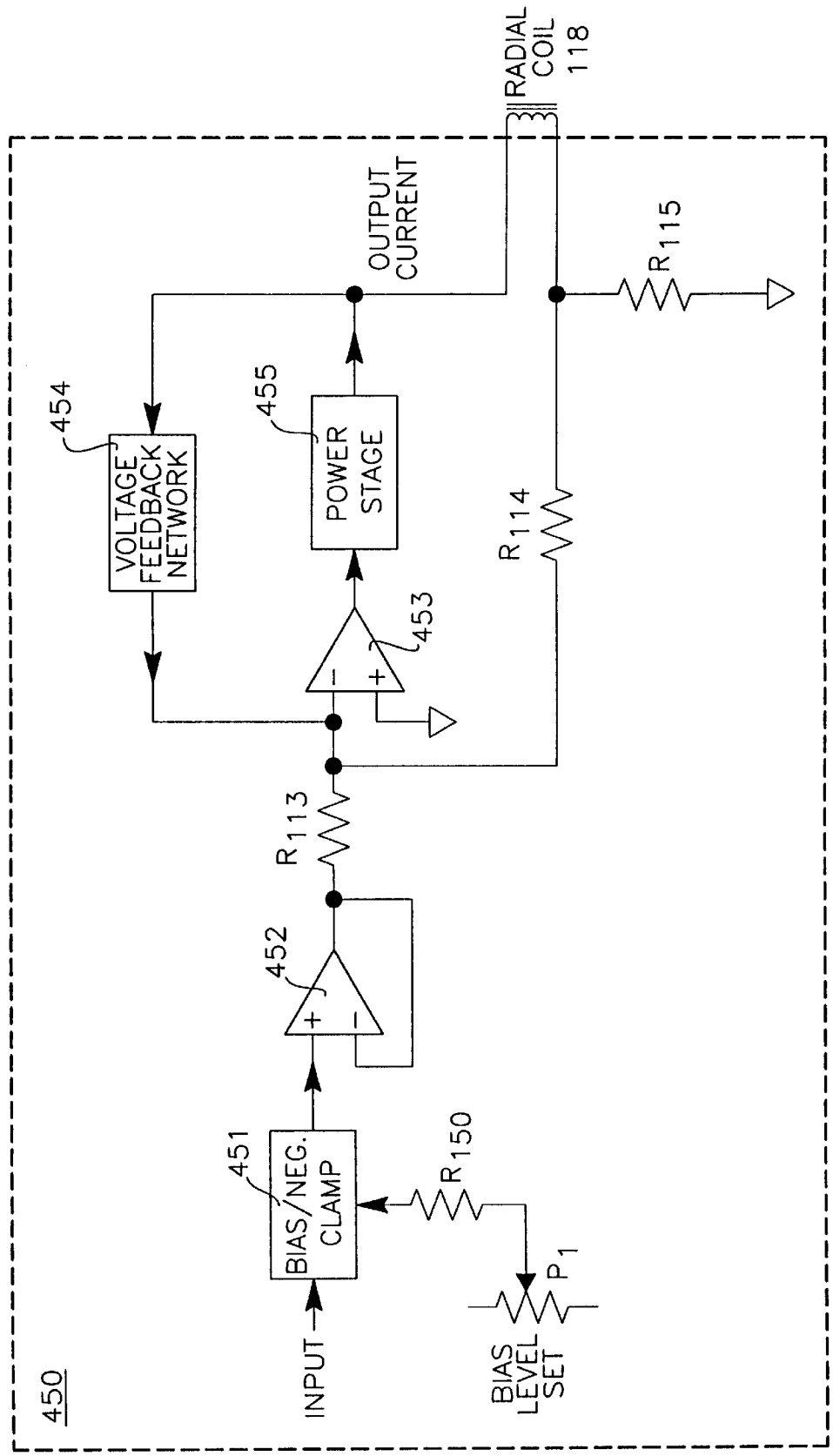
FIG. 20 is a partially block, partially schematic diagram of a radial power amplifier of the radial control electronics depicted in FIG. 10.

A block diagram of a radial power amplifier 450 is shown in FIG. 20. The stability of the control system requires the linear time delay of the coil current in response to the input signal to be less than 20 microseconds. This amplifier design meets this requirement by feeding back the coil current to the input of the high loop gain negative feedback amplifier, in which the current is sensed by a small resistor $R_{115}$ in series with the coil 118 and the high internal gain is supplied by the low power amplifier 453. The output power stage 455 is a high peak power capability linear current amplifier. Since the coil impedance has a large inductive reactance component, the voltage across the coil increases linearly with frequency for a constant current input. Voltage feedback is introduced through a network 454 designed to limit the high frequency gain while still permitting the needed fast current response.

The small bias current mentioned above is provided by a bias level set adjustment potentiometer $P_1$. When the input signal is driven so negative that the combination of the input signal and the bias current would be negative, the clamp circuit 451 clamps their sum to zero. It should be noted that this feature is necessary in order to obtain the desired linear relationship between the input signal and the total force exerted by the sum of the positive and negative force generators 119. It should also be mentioned that he output of bias/negative clamp circuit 451 is applied to amplifier 453 via buffer 452 and resistor $R_{113}$.

Advantageously, the thin laminations used in the magnetic circuit 20A, 20B result in the force following the current with a time delay of 25 microseconds. This value is consistent with the radial bearing control system requirements.

Figure 21:
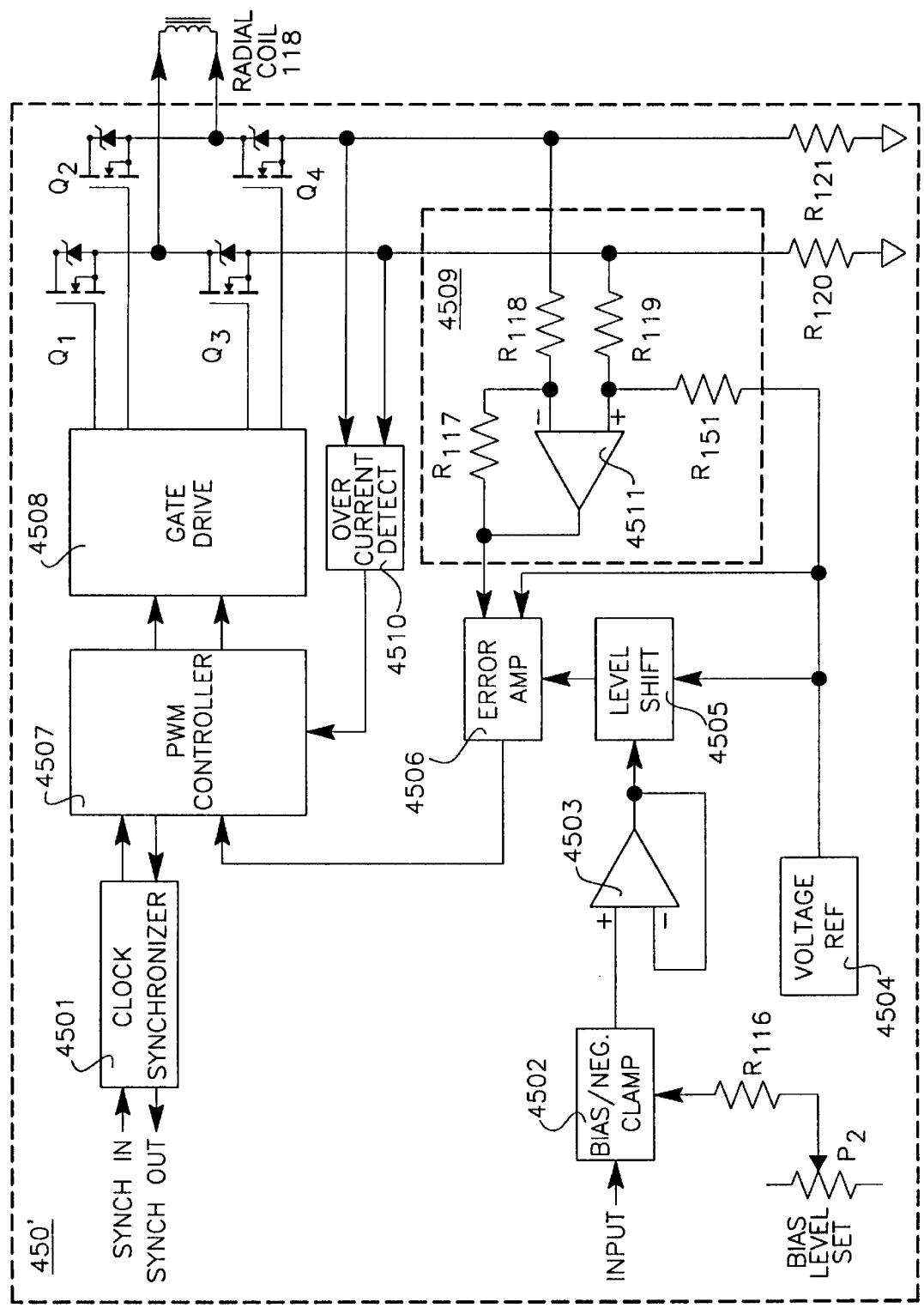
FIG. 21 illustrates an exemplary pulse width modulated radial power amplifier of the radial control electronics depicted in FIG. 10.

A pulse width modulated (PWM) power amplifier 450' advantageously may be employed in place of the linear power amplifier 450, in order to improve the efficiency. Such an amplifier is shown in FIG. 21. The PWM amplifier 450' preferably includes a bridge arrangement of field effect transistors (FETs) Q1–Q4, which permit current to be switched into the coil 118 in either direction, with the duty cycle of the PWM signals determining the magnitude of the current switched by these transistors. Advantageously, the FET control signals are developed in a PWM controller 4507 in response to the error signal amplifier 4506, which amplifies the difference between the current request of the input signal applied to clamp circuit 4502 and the actual current in the coil 118, as determined by the current detector 4509. PWM controller is preferably clocked via clock generator 4501, which can optionally be synchronized to an external clock (not shown). Advantageously, detector 4509, which includes a differential amplifier 4511 and a suitable network of biasing resistors $R_{117}$, $R_{118}$, $R_{119}$ and $R_{151}$, which preferably are connected as shown in FIG. 21. It will be understood that resistors $R_{120}$ and $R_{121}$ are used to sense respective currents passing through each leg of the bridge circuit.

The gate driver circuit 4508, which receives the output of the PWM controller 4507, supplies appropriate On/Off signals to the FETs Q1–Q4. As in the exemplary case wherein the power amplifier 450' is a linear amplifier, the high loop gain of the feedback amplifier 4509 provides a time delay of the current response small enough to meet the control system requirements. Preferably, the input bias and clamp and buffer circuits 4502, 4503 perform the same functions as the corresponding circuits in the linear amplifier 450. Preferably, the output of buffer 4503 is provided to error amplifier 4506 via a level shift circuit 4505, which circuit 4505 also receives a reference voltage signal from voltage reference source 4504. It will be noted that level shift circuit 4505 provides a linearizing bias current through coil 118.

The requirements for the axial magnetic bearing differ substantially from those of the radial bearings. It will be appreciated that: there are fewer axial vibration modes in the frequency range of interest; the synchronous vibrations due to residual unbalance do not couple to the axial system; the high power motor generator 15 forces have negligible effect in the axial direction; and, because of the permanent magnet bias, adequate linearity is achieved without resorting to a square root function circuit. However, the stiffness of the axial system must still be substantial in order to permit the flywheel 1001 to traverse potholes and cobblestone roads without engaging the touchdown bearings 130, 230. Achieving the required stiffness is complicated by the time delay of the axial force relative to the current in the axial force generator coil, which is more than ten times that in the radial bearing control electronics system 400. It should be noted that the axial delay results from the eddy currents created in the solid (unlaminated) metal used in the magnetic paths, particularly in the ends of shaft 20, by transient coil currents. It will be appreciated that spatial constraints dictate against laminating the axial magnetic circuit. The simplified requirements cited above, however, allow this higher delay to be acceptable.

Figure 22:
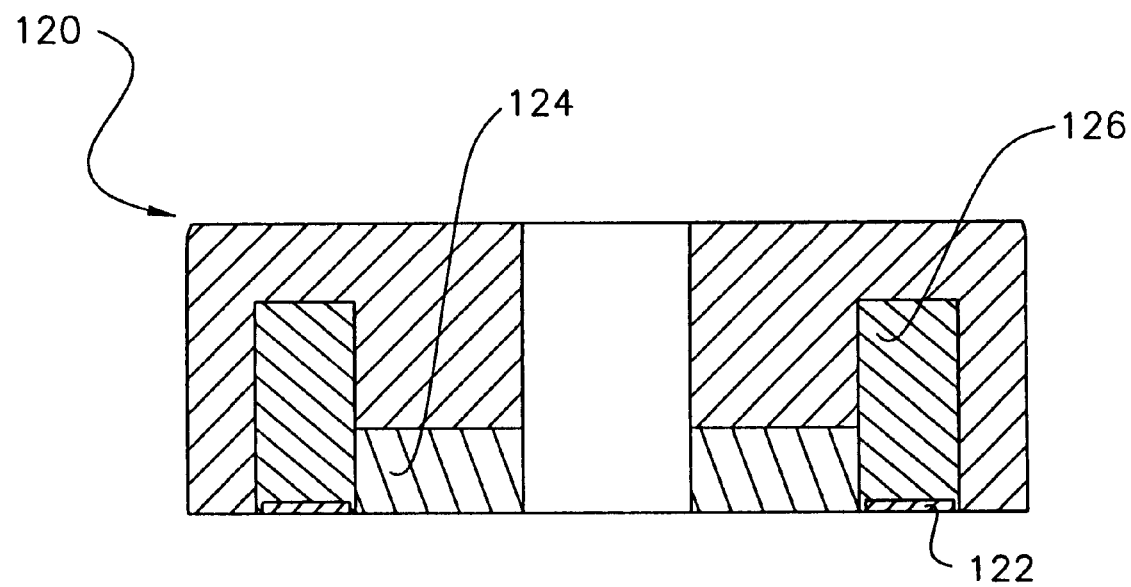
FIG. 22 illustrates an exemplary design of an axial magnetic bearing incorporating a capacitive sensor.
Figure 22:
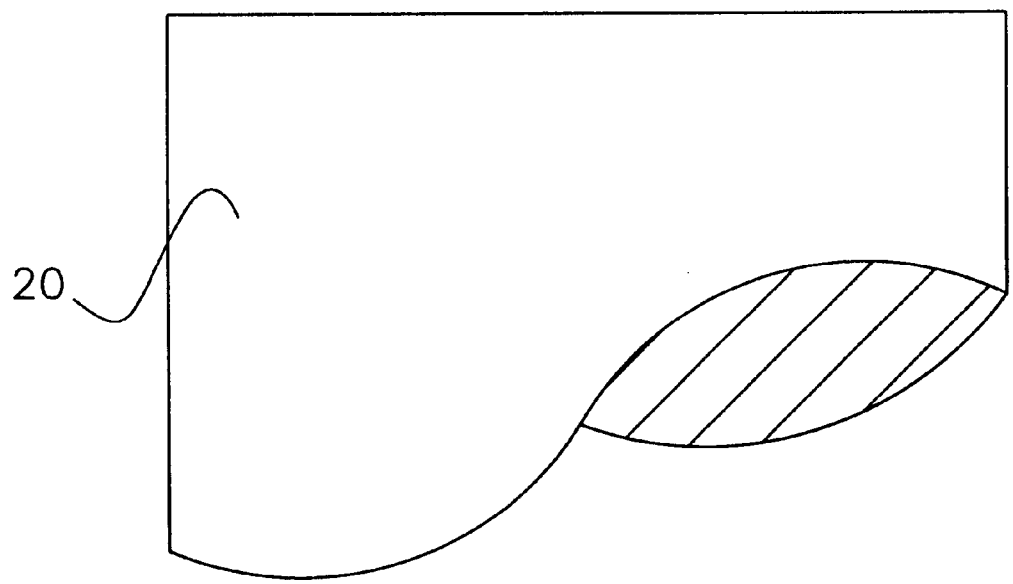
Figure 23:
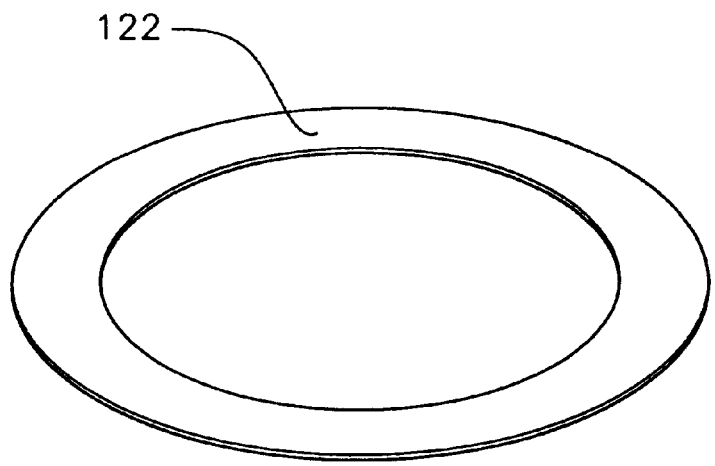
FIG. 23 illustrates an exemplary axial capacitive sensor.
Figure 24:
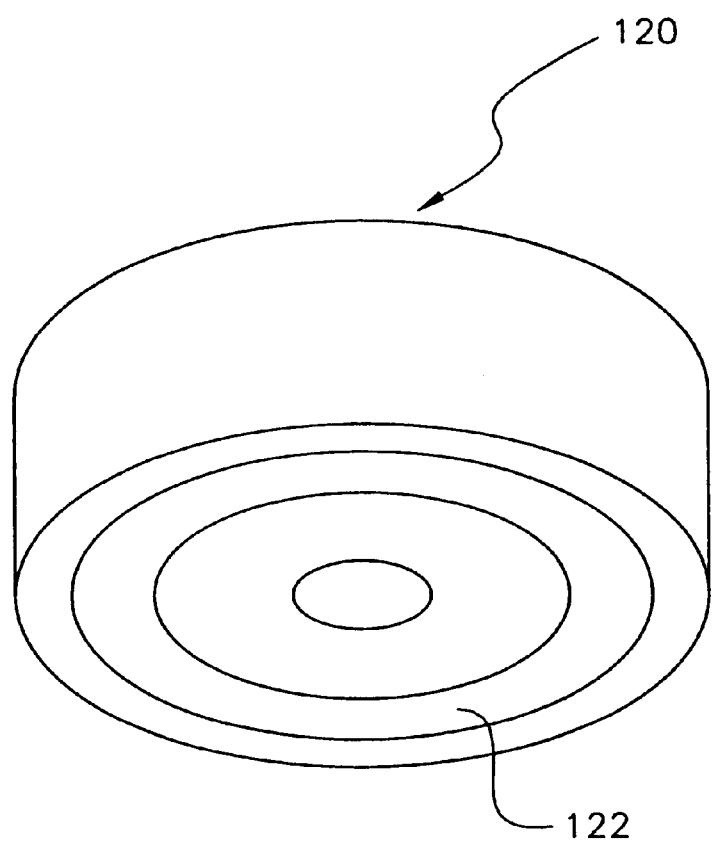
FIG. 24 depicts the integration of an exemplary axial capacitive sensor into the axial magnetic bearing.

Referring to FIGS. 22–24, an exemplary configuration of the axial bearings 120, 220 will now be described. An axial bearing 120 which includes the capacitive sensor 122 is shown in FIG. 22. Its magnetic field is produced by a combination of a permanent magnet 124 and a controllable electromagnet 126 whose magnetic field adds algebraically to that of the permanent magnet 124. The power amplifier (which is discussed in greater detail below), which produces this current, responds to the axial sensor 122 via a suitable transfer function (also discussed below). It is desirable for this sensor output signal to be linear with axial displacement of the shaft 20 over the range of interest, which in an exemplary case ranges from five thousandths to forty thousandths of an inch. The sensor processor shown in FIG. 6A has adequate linearity for this task, a consequence of resonating the capacitance to the stator $C_0$ with the inductance L at the oscillator frequency.

FIG. 23 shows the ring shaped sensing element 122 used in the axial sensing system, and the integration of this element into an axial bearing 120 is shown in FIG. 24.

Since the orientation of the rotor axis is nearly vertical while driving, and exactly vertical when parked, the weight of the rotor must be borne by the axial bearing 120. This force is provided by the permanent magnet 124 in the axial bearing 120's magnetic circuit, augmented by electromagnet coil 126 current to stabilize the control system 600 and respond to the transient loads incurred while driving. It should be mentioned that the exemplary case being discussed includes a permanent magnet 124 in the upper axial bearing only; the lower axial bearing 220 may advantageously include a permanent magnet 224 when operating conditions warrant the additional magnetic bias.

Since the permanent magnet 124 provides a field whose lifting force is equal to the weight of the rotating assembly 1, the incremental force provided by the electromagnet 126 is linear with its current, to the first order. Therefore, it will be recognized that no square root circuit is needed to linearize the axial control system 600.

Figure 25A:
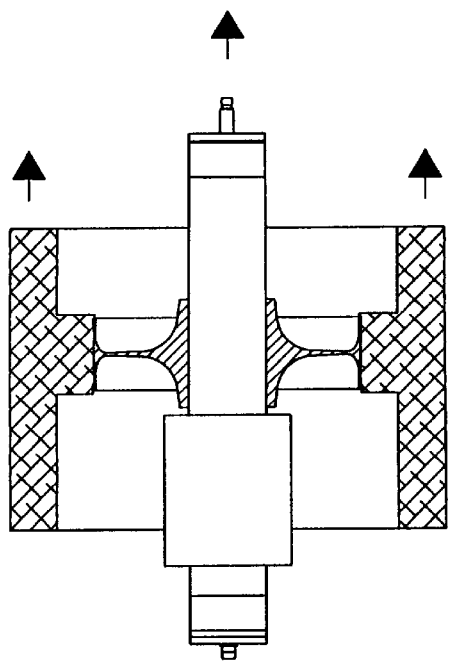
FIGS. 25A and 25B show the axial vibration modes of the rotating assembly.
Figure 25B:
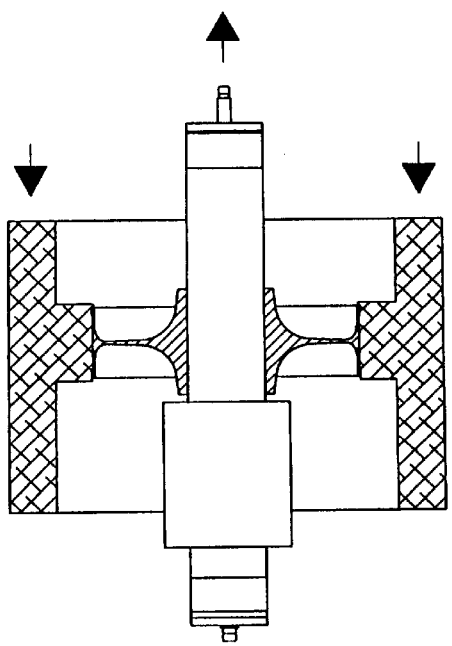
Figure 26:
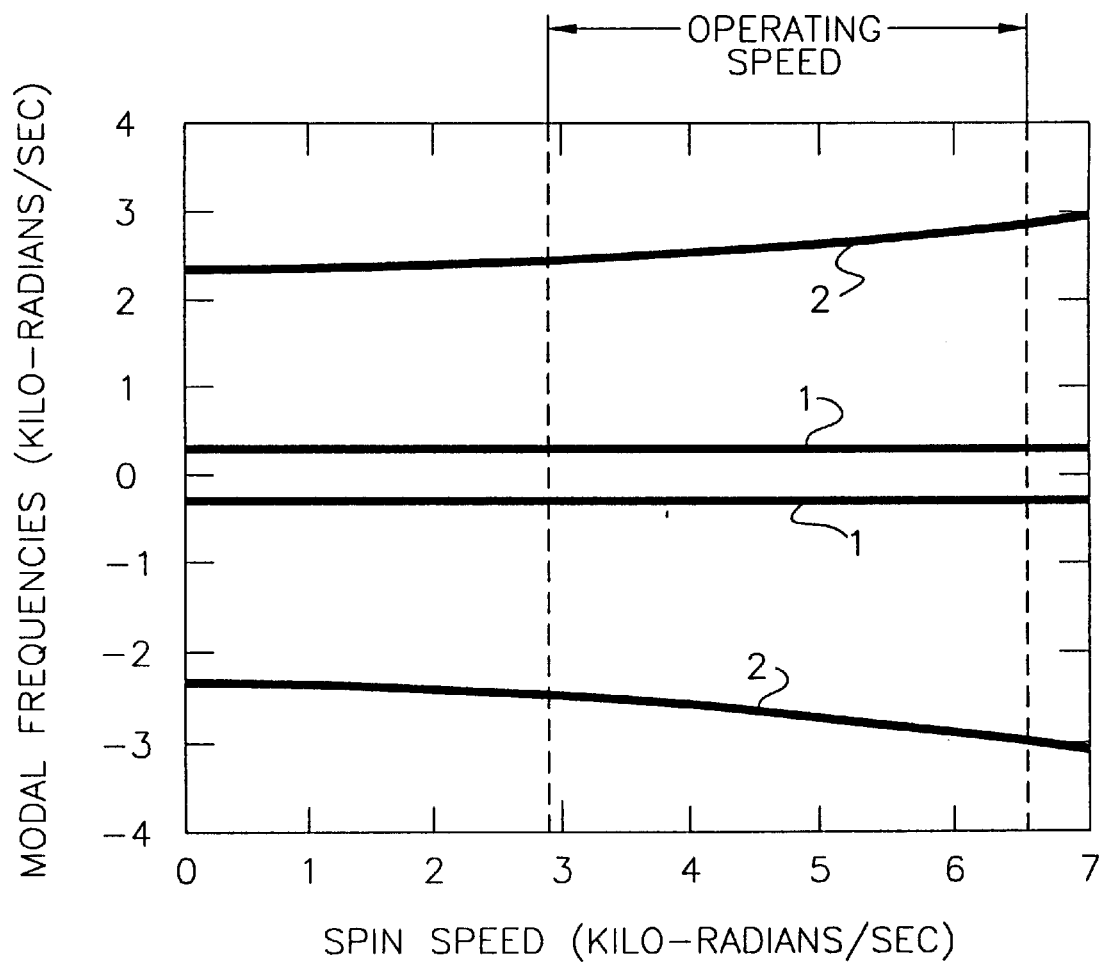
FIG. 26 shows the axial modal frequencies as a functions of the rotor rotation speed.

The axial vibration modes of the rotating assembly are shown in FIG. 25A, which illustrates rigid translation (mode A1), and FIG. 25B, which depicts flexible translation (mode A2). The frequencies associated with these modes are illustrated as a function of spin speed in FIG. 26. Unlike the coning modes associated with the radial bearing system, there is no gyroscopic coupling associated with the axial modes; thus the positive and negative frequencies are identical. It should be noted that the frequency of the flexible translation mode A2 is associated primarily with the compliance of the hub 14. See FIG. 2A. Because of the stiffening of the hub 14 due to its radial stretch under centrifugal force, the frequency of mode A2 vibrations increases with spin speed.

Figure 27:
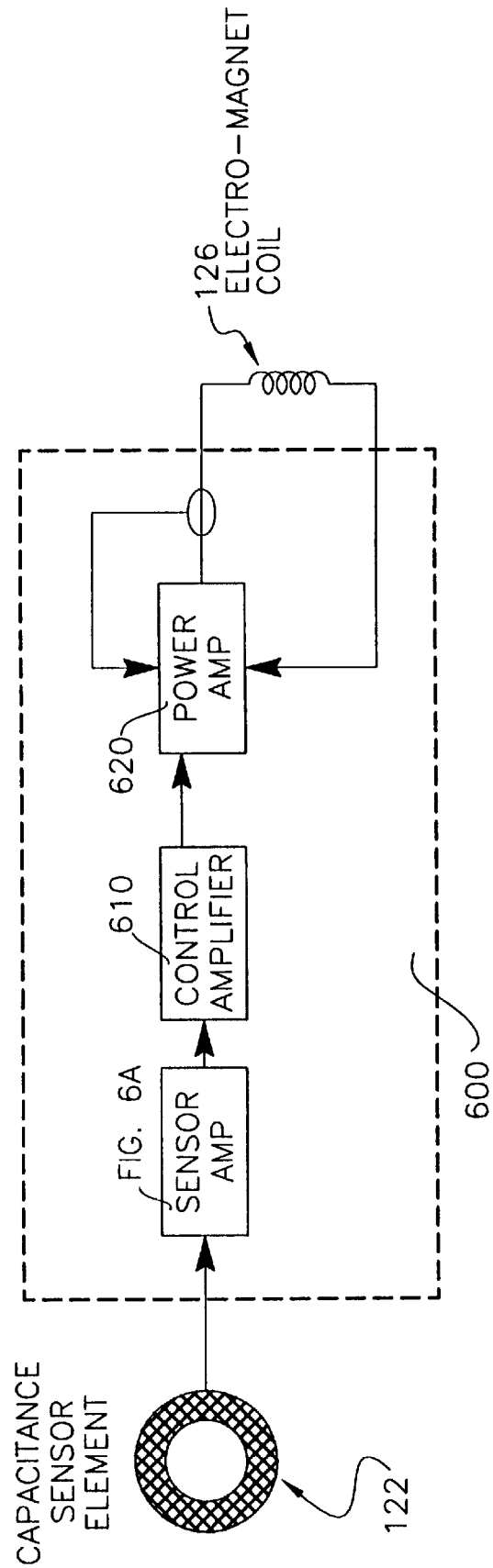
FIG. 27 is a high level block diagram of the axial bearing electronic control system according to a preferred embodiment of the present invention.
Figure 28:
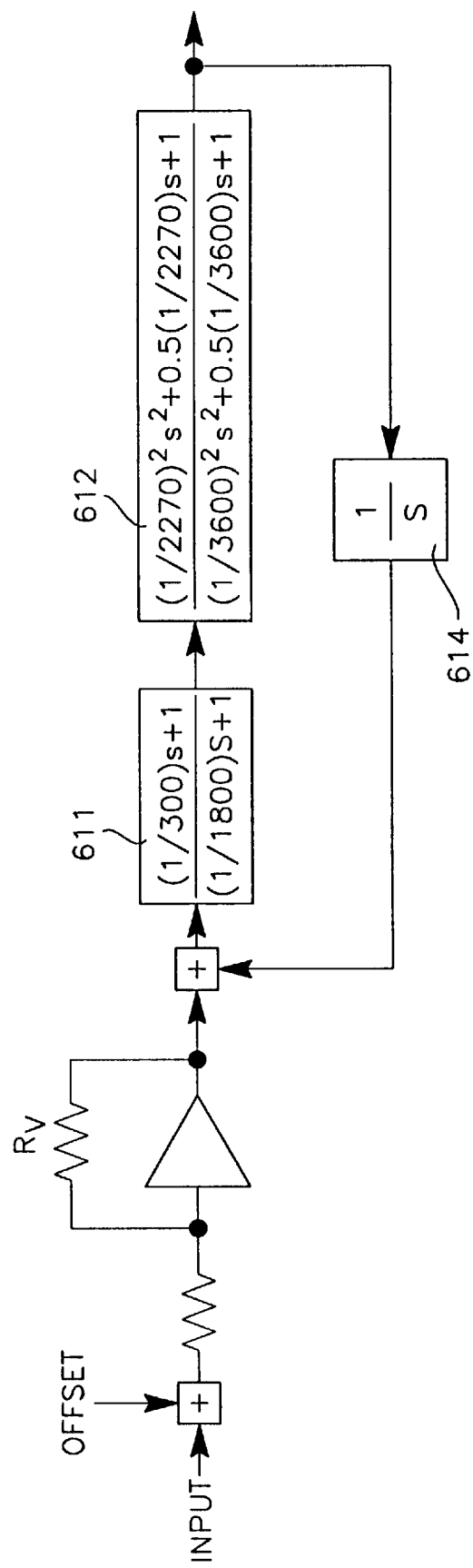
FIG. 28 is a mathematical function diagram collectively formed from FIGS. 28A and 28B, which latter Figures from a schematic diagram of an exemplary axial control amplifier employed in the circuitry of FIG. 27.
Figure 28A:
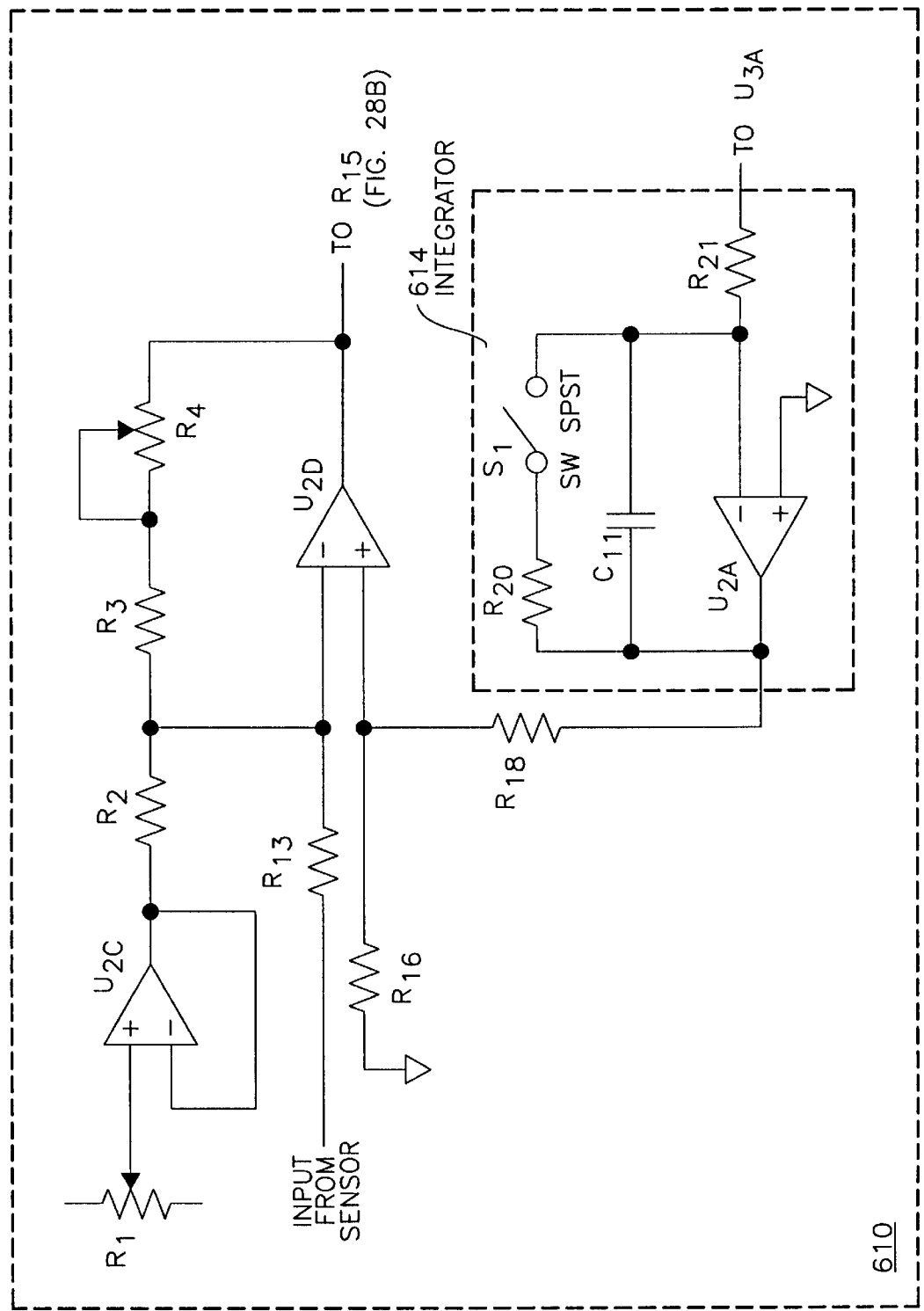
Figure 28B:
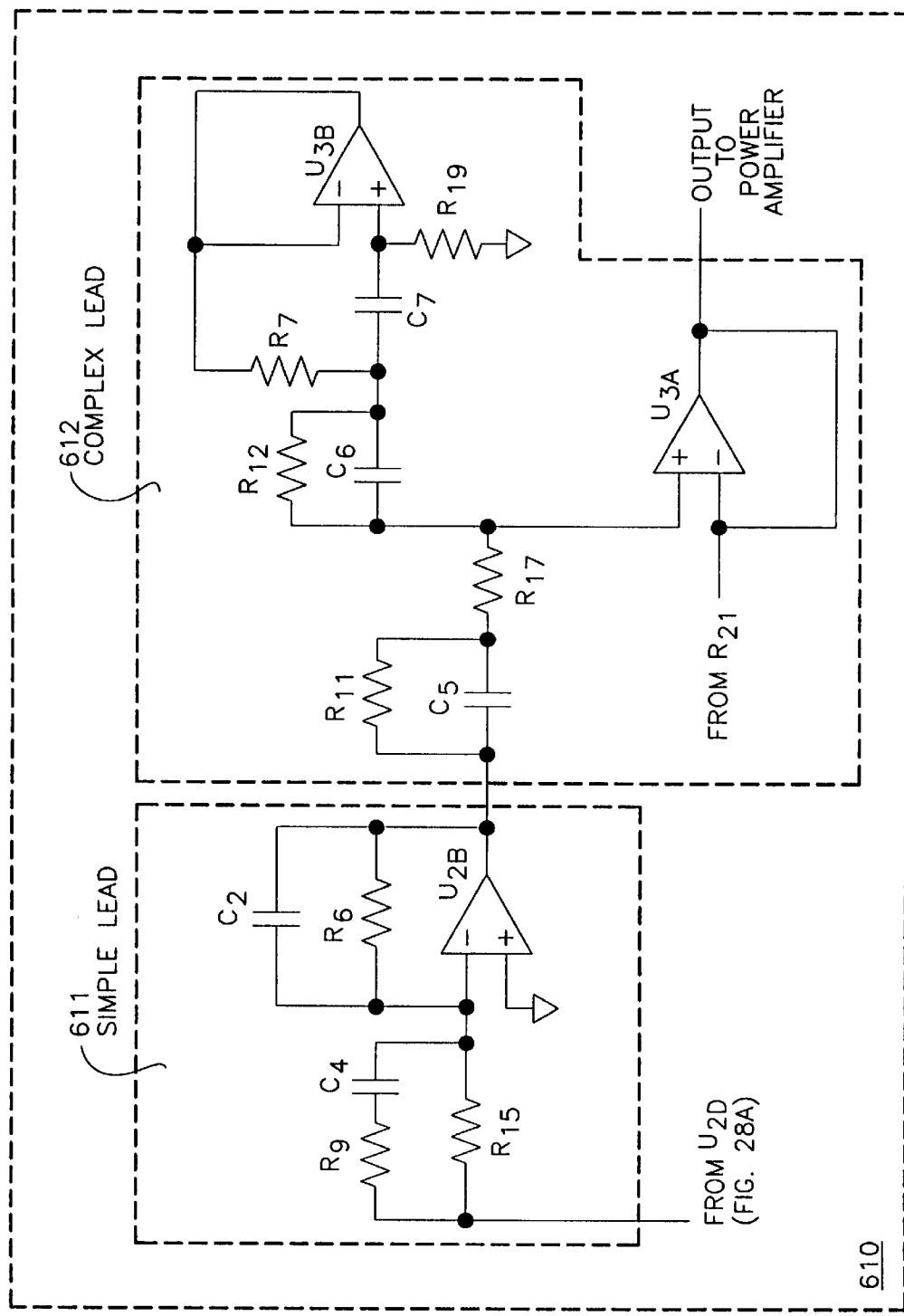

A block diagram of the axial bearing electronic control system 600 according to a preferred embodiment of the present invention is illustrated in FIG. 27, wherein the capacitive sensing element 122 is coupled to a power amplifier 620, in an exemplary case, via a control amplifier 610 and the sensing circuit shown in FIG. 6A. Preferably, the analog control amplifier 610, which provides the desired control stiffness, resonance damping, and power minimization in the parking mode of operation can be configured as shown in FIGS. 28A and 28B, which comprise the overall block diagram of FIG. 28.

It should be noted that the phase lead for damping the rigid body resonance (mode A1 of FIG. 25A) is provided by the simple lead network 611 having a real pole and zero, while the phase lead needed to damp the flexible body resonance (mode A2 of FIG. 25B) is produced by a complex lead network 612 having complex poles and zeroes.

Figure 29:
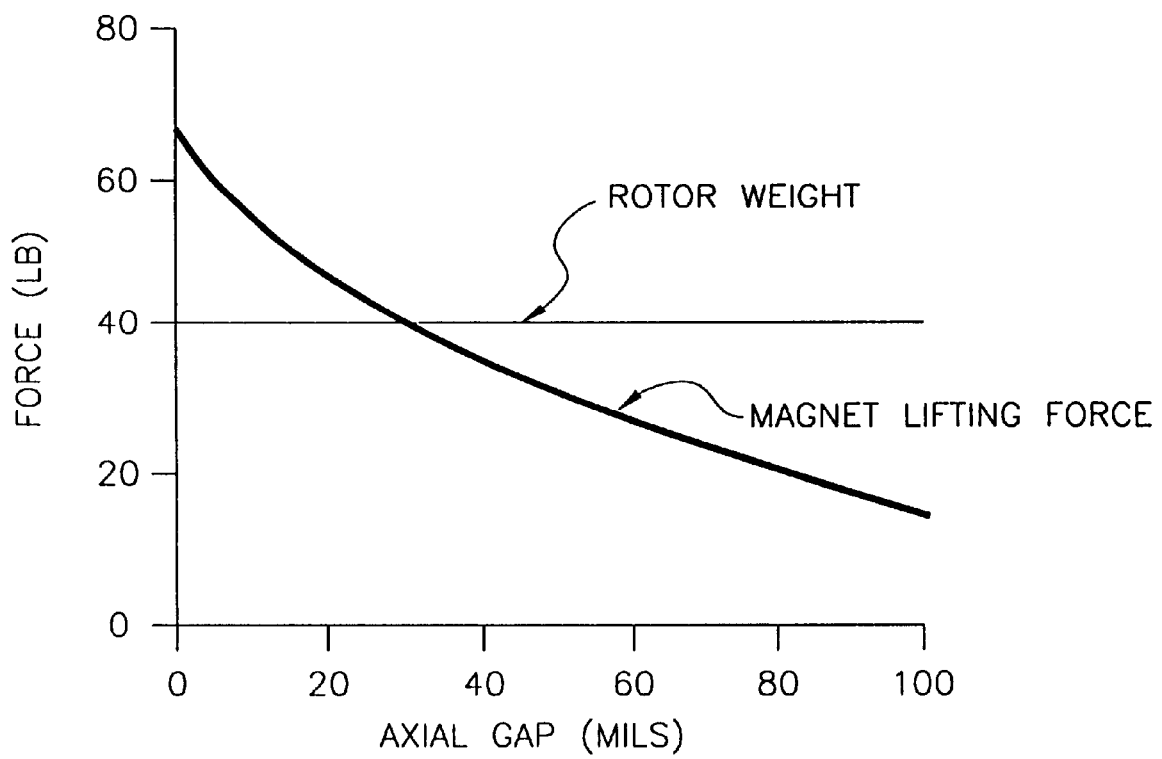
FIG. 29 illustrates the variation of force for the axial permanent magnet versus axial gap.

Because the power consumed in the parking mode of operation must be minimized, it is necessary to null the axial electromagnet current when parked. The variation with magnetic gap of the lifting force produced by the permanent magnet is shown in FIG. 29, which also indicates the gap at which this force is equal to the weight of the rotating assembly 1. The integrator 614 shown in an internal positive feedback path in the axial control amplifier circuit 600 changes the axial position of the shaft 20 until the input signal of integrator 614, which signal in the steady state is also the input to the power amplifier 620, is zero. Thus, the rotating assembly 1 is automatically driven to the unique axial position at which the control current is nulled. It will be appreciated that this technique is quite similar to the technique taught in U.S. Pat. No. 3,860,300 to Lyman, which patent is incorporated herein by reference for all purposes. It will be again be appreciated that comprehension and reconstruction of the circuitry shown in FIGS. 28A through 28B, particularly with the associated transfer function illustrated in FIG. 30A and its associated outputs illustrated in FIGS. 30B and 30C, is well within the level of one of ordinary skill in the art; further detailed discussions will not be provided.

Figure 30A:
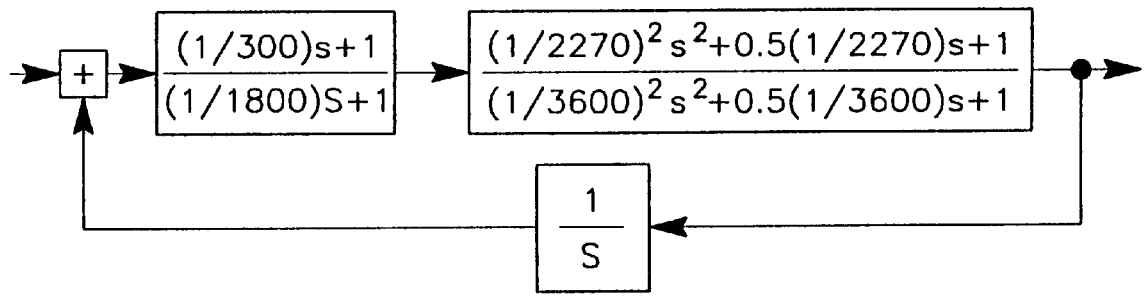
Figure 30B:
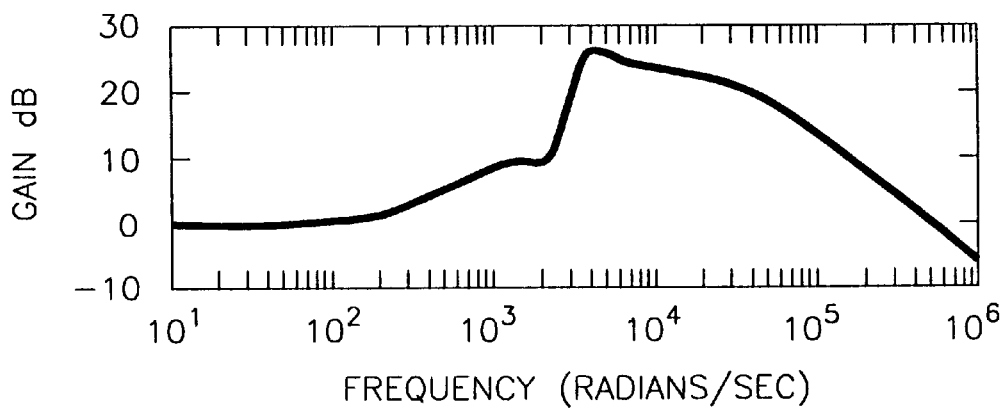
FIGS. 30B and 30C show the respective amplitude and phase provided by the axial transfer function.
Figure 30C:
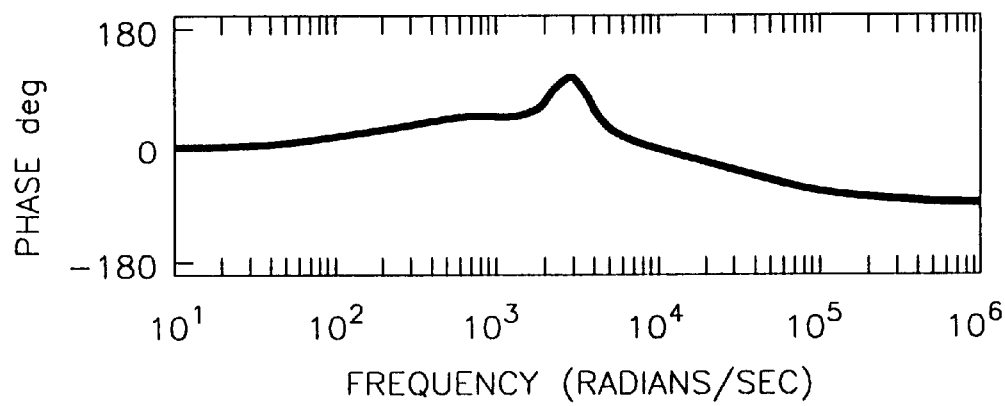

The transfer function of the control amplifier 610 according to a preferred embodiment of the present invention is shown in FIG. 30A; the corresponding amplitude and phase as a function of frequency produced using this transfer function is illustrated in FIGS. 30B and 30C. It should be mentioned that in an alternative digital implementation of the axial bearing control electronics circuit 600, these axial control functions are produced in the same microprocessor 510 previously described with respect to the radial functions. It will be again be appreciated that comprehension and reconstruction of the circuitry shown in FIGS. 28A through 28B, particularly with the associated transfer function illustrated in FIG. 30A and its associated outputs illustrated in FIGS. 30B and 30C, is well within the level of one of ordinary skill in the art; further detailed discussions will not be provided.

Figure 31:
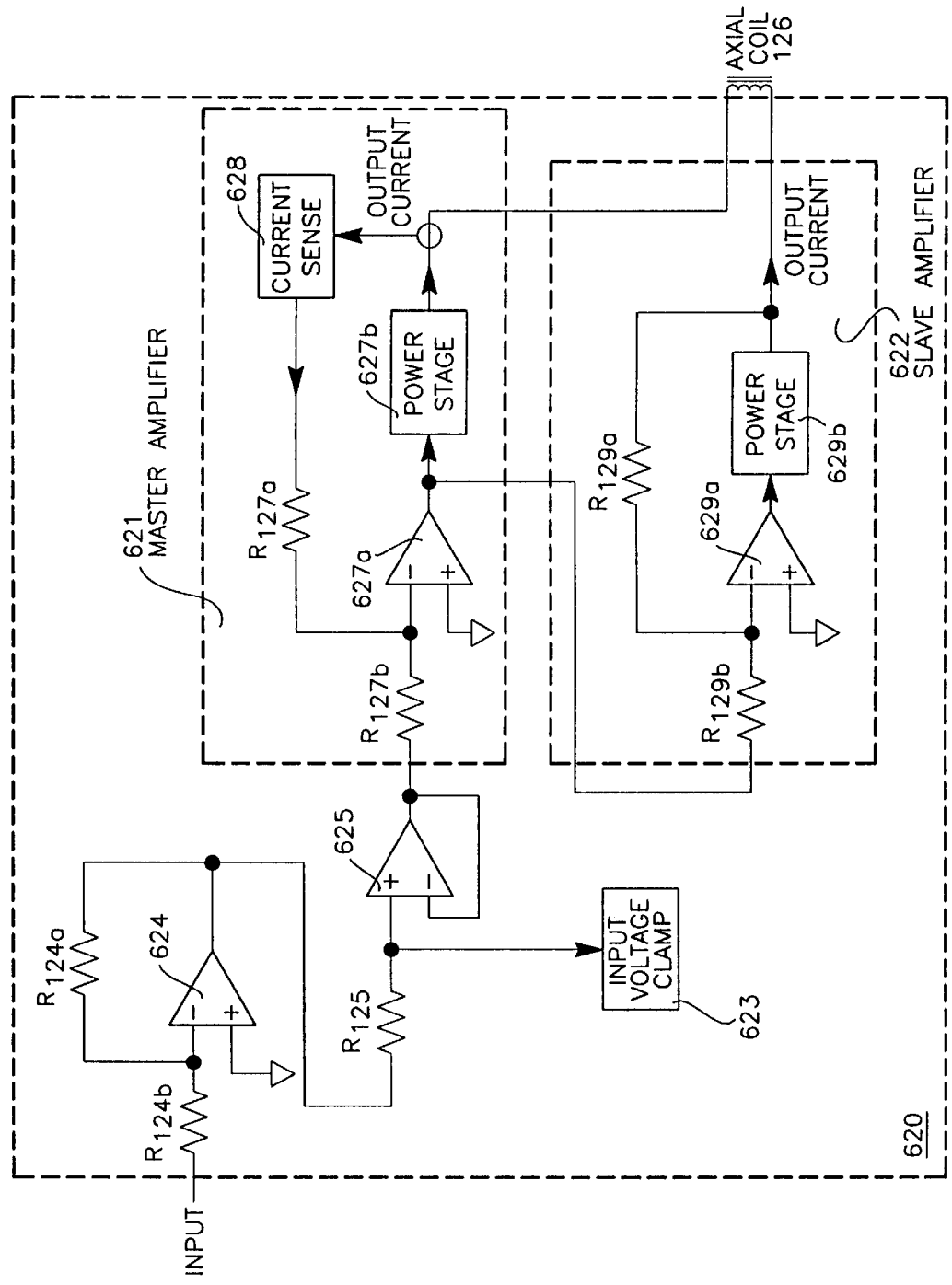
FIG. 31 is a diagram of the axial power amplifier of the axial bearing electronic control system illustrated in FIG. 27.

The axial power amplifier circuit 620 according to a preferred embodiment of the present invention is shown in FIG. 31. It will be appreciated that circuit 620 provides enough current to the control coil 126 to maintain magnetic suspension while traversing very rough pavement. In addition, power amplifier circuit 620 advantageously is capable of providing sufficient current to coil 126 for lifting, in conjunction with the permanent magnet 124, the rotating assembly 1 from its extreme downward position on the lower touchdown bearing 230 whenever the need arises.

Referring to FIG. 31, the output stage consists of a master amplifier 621 driving one end of the coil 126 and a slave amplifier 622 driving the other end with a voltage of the opposite sign, thus doubling the voltage available across the coil 126 for a given power supply voltage. An input voltage clamp 623 advantageously can be used to prevent a magnetic field created by the coil 126 in the direction which opposes the permanent magnet bias field from reversing the total field. The output of control amplifier 610 (610') is provided to master amplifier 621 via a biasing amplifier stage including amplifier 624 and resistors $R_{124a}$ and $R_{124b}$ and a buffer/clamp stage including resistor $R_{125}$ and amplifier 625. Advantageously, master amplifier 621 includes a high internal gain amplifier 627a and a high power amplifier 627b. The output current from stage 627b is detected by current sense circuit 628 and a voltage indicative of the current level is provided to amplifier 627a via resistor R127a. The output of amplifier 627a is also provided to slave amplifier 622, which includes a conditioning resistor $R_{129b}$, high internal gain amplifier 629a, power stage 629b and a feedback path connecting the output of power stage 629b with the input of amplifier 629a via resistor R129a.

Figure 32:
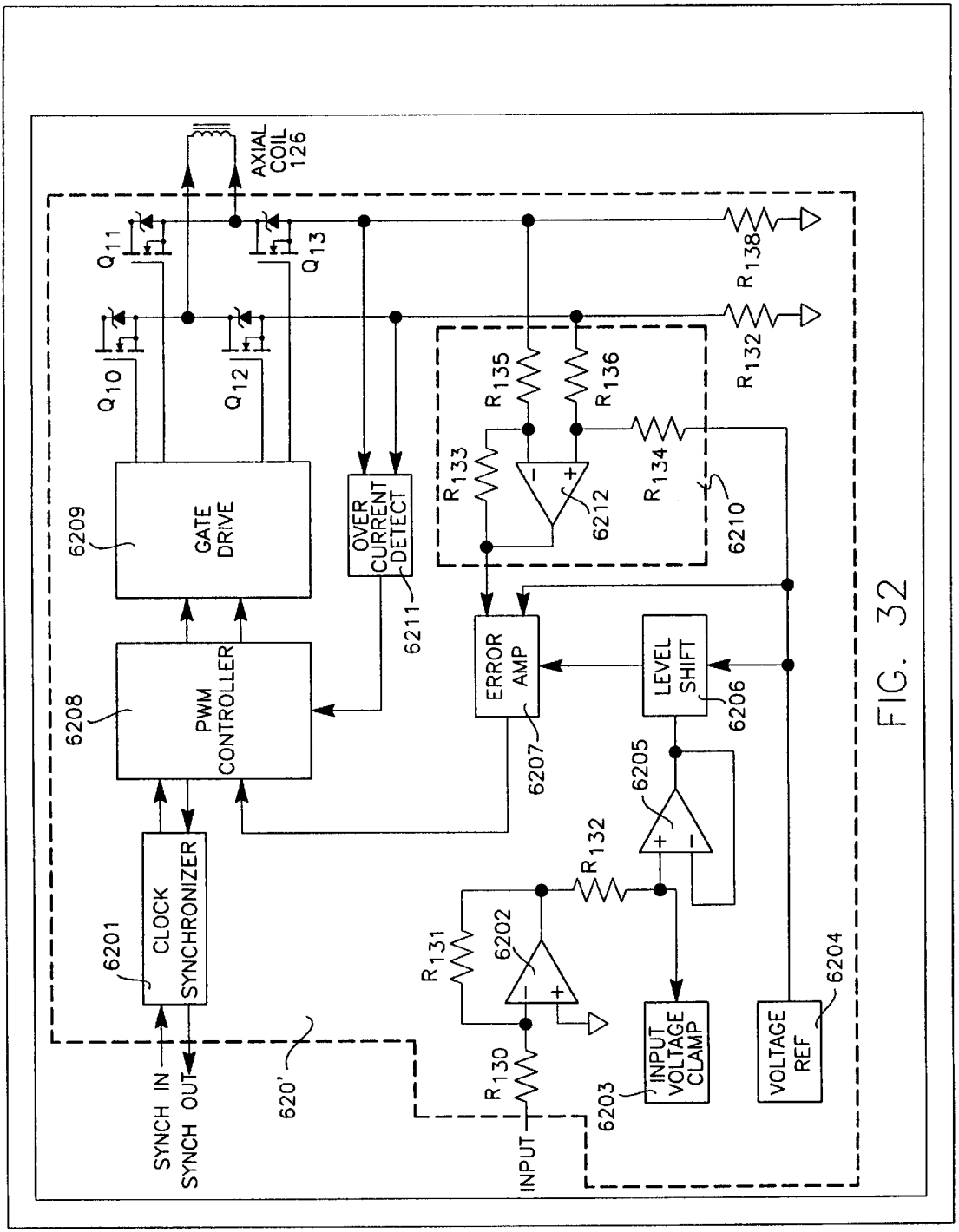
FIG. 32 shows an exemplary pulse width modulated axial power amplifier of the axial bearing electronic control system illustrated in FIG. 27.

A PWM version of the axial power amplifier 620' according to another preferred embodiment of the present invention is illustrated in FIG. 32. It will be appreciated that amplifier 620' is similar to the radial amplifier 450' depicted in FIG. 21. It will be appreciated that the PWM axial power amplifier 620' differs from the PWM radial power amplifier 450' mainly with respect to the input voltage clamp resulting from the use of a permanent magnet field rather than electromagnet current to generate the bias field.

A pulse width modulated power (PWM) amplifier 620' advantageously may be employed in place of the power amplifier 620, in order to improve the efficiency of the power output stage. Referring to FIG. 32, the PWM amplifier 620' preferably includes a bridge arrangement of field effect transistors (FETs) Q10–Q13, which permit current to be switched into the coil in either direction, with the duty cycle of the PWM signals determining the magnitude of the current switched by these transistors. Advantageously, the control signals applied to FETs Q1O–Q13 are developed in a PWM controller 6208 in response to the error signal amplifier 6207, which amplifies the difference between the current request of the input signal applied to level shift circuit 6206 and the actual current in the coil 126, as determined by the detector 6210. Advantageously, the level shift is provided to allow a quiescent current to be provided to each coil 126.

It will again be noted that the gate driver circuit 6209, which receives the output of the PWM controller 6208, supplies appropriate On/Off signals to the FETs Q10–Q13. Advantageously, these signals are developed in a PWM controller 6208 in response to a control signal produced by error signal amplifier 6207, which amplifies the difference between the current request of the input signal applied to an input amplifier stage including amplifier 6202 and resistors $R_{130}$, $R_{131}$ and the actual current in the coil 126, as determined by the current detector 6210. PWM controller 6208 is preferably clocked via clock generator 6201, which can optionally be synchronized with an external master clock signal. Advantageously, detector 6210, which includes a differential amplifier 6212 and a suitable network of biasing resistors $R_{133}$, $R_{134}$, $R_{135}$ and $R_{136}$, which preferably are connected as shown in FIG. 32. It will be understood that resistors $R_{132}$ and $R_{138}$ are used to sense the current through each leg of the bridge circuit discussed above.

Also from FIG. 32, it will be appreciated that output of the amplifier 6202 is applied to error amplifier 6207 via resistor $R_{132}$, buffer amplifier 6205 and level shift circuit 6206. Circuit 6205 also receives a reference voltage signal from voltage reference source 6204.

As in the exemplary case wherein the power amplifier 620 is a linear amplifier, the high loop gain of the feedback amplifier 6210 provides a time delay of the current response small enough to meet the control system requirements. Preferably, the input voltage clamp circuit 6203 performs the same function as the corresponding circuit element in power amplifier 620, which is illustrated in FIG. 31.

It will be appreciated that the bearing system and associated control systems advantageously can be part of a flywheel used in applications other than motor vehicles. For example, the flywheel, which includes a motor-generator, can be coupled to a power distribution system so as to permit the flywheel to act as a power conditioning device. It will be appreciated that a power conditioning flywheel would not be subjected to the high amplitude, short duration vertical shocks associated with vehicle applications. Therefore, in stationary applications the lower axial force generator 220 can be omitted; any necessary downward force can be provided by the simple expedient of reducing the coil current in the upper axial force generator 120.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A bearing system for positioning and supporting a flywheel rotating assembly including a vertical shaft coincident with a main rotation axis and an attached cylinder use for energy storage and high surge power delivery, said first through fourth radial force generators disposed in a first plane perpendicular to the rotation axis of the rotating assembly, said first through fourth force generators including only electromagnets;

fifth through eighth radial force generators disposed in a second plane perpendicular to the rotation axis of the rotating assembly and different than said first plane, said fifth through eighth force generators including only electromagnets;

an upper axial force generator containing an electromagnet and a permanent magnet; an electronic control system including electronic control elements controlling said first through eighth radial force generators and said upper force generator;

first and second means for maintaining the rotor in a predetermined cylindrical volume within the flywheel when forces generated by said first through eighth radial force generators are less than displacement force applied to the shaft;

first through fourth capacitive sensors for locating the rotor with respect to said first through eighth radial force generators and for generating corresponding first through fourth position signals;

notch filter means for eliminating a synchronous runout signal generated by said control system in an operating speed range, for receiving said first through fourth position signals and a rotor speed signal and for generating first through fourth filtered signals, said notch filter means being tuned to a sinusoidal shaft bending mode frequency to thereby prevent amplification of the sinusoidal shaft bending mode frequency responsive to respective said first through eighth coil currents;

transfer function means, which dynamically stabilizes said control system, for receiving said first through fourth filtered signals and for applying a transfer function so as to generate first through fourth transfer function signals, said transfer function means comprising:
   a plurality of first phase lead networks, each having a real pole and a real zero; and
   a plurality of second phase lead networks having complex poles and zeroes;
gain control means responsive to said first through fourth transfer function signals and respective first through eighth coil currents for generating respective first through fourth gain-limited signals;
first through eighth square root circuits each receiving one of said first through fourth gain-limited signals for generating respective first through eighth square root signals; first through eighth power amplifiers for generating respective said first through eighth coil responsive to respective said first through eighth square root signals;
fifth capacitive sensor means for locating the rotor with respect to said upper axial force generator and for generating a fifth position signal;
second control amplifier means for receiving said fifth position signal and applying a transfer function so as to generate a fifth transfer function signal, said second control amplifier means comprising:
   a first axial phase lead network having a real pole and a real zero; and
   a second axial phase lead network having a complex pole and zeroes; and second power amplifier means responsive to said fifth transfer function signal and a ninth coil current for generating said ninth coil current; wherein
said first through eighth coil currents excite respective ones of said first through eighth radial force generators,
said first and second phase lead networks are tuned to provide phase lead at predetermined vibration mode frequencies of the rotor,
said ninth coil current excites said upper axial force generator,
said first means, said upper axial force generator, and said first through fourth radial force generators collectively comprise an upper bearing element disposed proximate to an upper end of the shaft,
said fifth through eighth force generators, and said second means collectively comprise a lower bearing element disposed proximate to a lower end of the vertical shaft,
said first through eighth radial force generators and said upper axial force generator position and support the rotating assembly without engaging said first and second means despite the maximum radial forces which can be exerted by a motor-generator having a rotor operatively connected to the shaft, and
said first through eighth radial force generators and said upper axial force generator produce eddy current losses which are small enough so as to permit the rotating assembly to have a spin down time of more than one week.

2. The bearing system as recited in claim 1, further comprising:
   a lower axial force generator containing an electromagnet; and
   sixth capacitive sensor means for locating the rotor with respect to said lower axial force generator and for generating a sixth position signal; and wherein
   said electronic control system further comprises means including electronic control elements for controlling said upper and lower axial force generators;
   said second control amplifier means further comprises means for receiving said fifth and sixth position signals and applying a transfer function so as to generate said fifth and a sixth transfer function signals, said second control amplifier means comprising:
   said first axial phase lead network having a real pole and a real zero; and
   said second axial phase lead network having a complex pole and zeroes;
   said second power amplifier means further comprises means responsive to said fifth and sixth transfer function signals and said ninth and a tenth coil currents for generating said ninth and tenth coil currents;
   said ninth and tenth coil currents excite respective ones of said upper and lower axial force generators,
   said fifth through eighth force generators, said lower axial force generator, and said second means collectively comprise a lower bearing element disposed proximate to a lower end of the vertical shaft,
   said first through eighth radial force generators and said upper and lower axial force generators position and support the rotating assembly without engaging said first and second means despite the maximum radial forces which can be exerted by a motor-generator having a rotor operatively connected to the shaft, and
   said first through eighth radial force generators and said upper and lower axial force generators produce eddy current losses which are small enough so as to permit the rotating assembly to have a spin down time of more than one week.

* * * * *